US012561949B2

(12) United States Patent
Deschaintre et al.

(10) Patent No.: US 12,561,949 B2
(45) Date of Patent: Feb. 24, 2026

(54) CONDITIONAL PROCEDURAL MODEL GENERATION

(71) Applicant: Adobe Inc., San Jose, CA (US)

(72) Inventors: Valentin Mathieu Deschaintre, London (GB); Yiwei Hu, New Haven, CT (US); Paul Guerrero, London (GB); Milos Hasan, Lafayette, CA (US)

(73) Assignee: Adobe Inc., San Jose, CA (US)

( * ) Notice: Subject to any disclaimer, the term of this patent is extended or adjusted under 35 U.S.C. 154(b) by 325 days.

(21) Appl. No.: 18/329,385

(22) Filed: Jun. 5, 2023

(65) Prior Publication Data

US 2024/0404244 A1      Dec. 5, 2024

(51) Int. Cl.
| | |
|---|---|
| *G06K 9/00* | (2022.01) |
| *G06V 10/44* | (2022.01) |
| *G06V 10/54* | (2022.01) |
| *G06V 10/74* | (2022.01) |

(52) U.S. Cl.
CPC ............ *G06V 10/761* (2022.01); *G06V 10/44* (2022.01); *G06V 10/54* (2022.01)

(58) Field of Classification Search
CPC ....... G06V 10/761; G06V 10/44; G06V 10/54
See application file for complete search history.

(56) References Cited

U.S. PATENT DOCUMENTS

| | | | |
|---|---|---|---|
| 10,134,108 B2 | 11/2018 | Amirghodsi et al. | |
| 10,636,209 B1 | 4/2020 | Thaller et al. | |
| 11,410,361 B2 * | 8/2022 | Krs ........................ G06T 11/60 | |
| 11,900,514 B2 | 2/2024 | Krs et al. | |
| 2013/0120392 A1 * | 5/2013 | Mech ................... G06T 11/001 | |
| | | | 345/441 |
| 2014/0369670 A1 | 12/2014 | Herfet et al. | |
| 2015/0084989 A1 | 3/2015 | Laughlin et al. | |
| 2016/0048636 A1 | 2/2016 | Warner et al. | |
| 2017/0278289 A1 | 9/2017 | Marino et al. | |
| 2018/0101972 A1 | 4/2018 | Asente et al. | |
| 2019/0287224 A1 | 9/2019 | Amirghodsi et al. | |
| 2020/0285464 A1 | 9/2020 | Brebner | |
| 2022/0130086 A1 | 4/2022 | Krs et al. | |

(Continued)

OTHER PUBLICATIONS

Node Grapg Optimization Using Differentiable Proxies, Yiwei Hu et al., arXiv, 2022, pp. 1-9 (Year: 2022).*

(Continued)

*Primary Examiner* — Jayesh A Patel
(74) *Attorney, Agent, or Firm* — FIG. 1 Patents

(57)      ABSTRACT

Conditional procedural model generation techniques are described that enable generation of procedural models that are usable to recreate a visual appearance of an input image. A content processing system, for instance, receives a training dataset that includes a plurality of training pairs. The content processing system trains a machine learning model to generate procedural models based on input images. The content processing system then receives an input image that has a particular visual appearance. The content processing system leverages the trained machine learning model to generate a procedural model that is usable to recreate the particular visual appearance of the input digital image.

20 Claims, 12 Drawing Sheets
(8 of 12 Drawing Sheet(s) Filed in Color)

(56) References Cited

U.S. PATENT DOCUMENTS

2022/0179374 A1    6/2022   Kaberg Johard
2022/0351436 A1   11/2022   Krs et al.

OTHER PUBLICATIONS

A Novel Framework For Inverse Procedural Texture Modeling, Yiwei Hu et al., ACM, 2019, pp. 186:1 to 186:14 (Year: 2019).*
A Sliced Wasserstein Loss for Neural Texture Synthesis, Eric Heitz et al., arXiv, 2021, pp. 1-9 (Year: 2021).*
MatFormer: A Generative Model for Procedural Materials, Paul Guerrero et al., arXiv, 2022, pp. 46:1-46:12 (Year: 2022).*
Node Graph Optimization Using Differentiable Proxies, Yiwei Hu et al., arXiv, 2022, pp. 1-9 (Year: 2022).*
Flexible SVBRDF Capture with a Multi-Image Deep Network, Valentin Deschaintre et al., arXiv, 2019, pp. 1-14 (Year: 2019).*
Image Transformer, Niki Parmar et al., PMLR, 2018, pp. 1-10 (Year: 2018).*
U.S. Appl. No. 17/867,082, "Notice of Allowance", U.S. Appl. No. 17/867,082, Oct. 16, 2023, 8 pages.
"Adobe Substance 3D", Adobe [retrieved Mar. 24, 2023]. Retrieved from the Internet <https://www.substance3d.com/>., 2 Pages.
"Final Office Action", U.S. Appl. No. 17/079,915, Dec. 29, 2021, 16 pages.
"First Action Interview Office Action", U.S. Appl. No. 17/079,915, Nov. 16, 2021, 3 pages.
"Notice of Allowance", U.S. Appl. No. 17/079,915, Mar. 30, 2022, 9 pages.
"Pre-Interview First Office Action", U.S. Appl. No. 17/079,915, Oct. 21, 2021, 3 pages.
U.S. Appl. No. 17/867,082, "Final Office Action", U.S. Appl. No. 17/867,082, May 11, 2023, 29 pages.
U.S. Appl. No. 17/867,082, "Non-Final Office Action", U.S. Appl. No. 17/867,082, Nov. 25, 2022, 24 pages.
U.S. Appl. No. 17/867,082, "Non-Final Office Action", U.S. Appl. No. 17/867,082, Jul. 20, 2023, 33 pages.
Aggarwal, Pranav et al., "Controlled and Conditional Text to Image Generation using Diffusion PriOR", Cornell University arXiv, arXiv.org [retrieved Apr. 3, 2023]. Retrieved from the Internet <https://arxiv.org/pdf/2302.11710.pdf>., Feb. 23, 2023, 24 Pages.
Alhashim, Ibraheem et al., "Deformation-Driven Topology-Varying 3D Shape Correspondence", ACM Transactions on Graphics, vol. 34, Issue 6, 2015 [retrieved on Oct. 2, 2020]. Retrieved from the Internet <shorturl.at/buGRS>., Oct. 26, 2015, 13 pages.
Aristidou, A et al., "Inverse Kinematics Techniques in Computer Graphics: A Survey", Wiley Online Linrary, Computer Graphics Forum, vol. 37, Issue 6 [retrieved on Oct. 2, 2020]. Retrieved from the Internet <shorturl.at/tvE03>., Nov. 29, 2017, 24 pages.
Beneš, B. et al., "Guided Procedural Modeling", Computer Graphics Forum, vol. 30, No. 2 [retrieved Oct. 21, 2021]. Retrieved from the Internet <https://doi.org/10.1111/j.1467-8659.2011.01886.x>., Apr. 28, 2011, 10 pages.
Brown, Tom et al., "Language Models are Few-Shot Learners", Advances in Neural Information Processing Systems [retrieved Mar. 27, 2023]. Retrieved from the Internet <https://armatech.us/OpenLanding/Language%20Models%20are%20Few-Shot%20Learners.pdf>., Jul. 22, 2020, 25 Pages.
Cook, Robert L. et al., "A Reflectance Model for Computer Graphics", ACM Transactions on Graphics [retrieved Mar. 24, 2023]. Retrieved from the Internet <https://dl.acm.org/doi/pdf/10.1145/357290.357293>., Jan. 1982, 18 pages.
Demir, Ilke et al., "Proceduralization for Editing 3D Architectural Models", Fourth International Conference on 3D Vision (3DV) [retrieved Mar. 24, 2023]. Retrieved from the Internet <https://www.cs.purdue.edu/homes/bbenes/papers/Demir163DV.pdf>., Oct. 2016, 9 Pages.
Deschaintre, Valentin et al., "Flexible SVBRDF Capture with a Multi-Image Deep Network", Cornell University arXiv, arXiv.org

[retrieved Mar. 24, 2023]. Retrieved from the Internet <https://arxiv.org/pdf/1906.11557.pdf>., Jun. 27, 2019, 14 Pages.
Deschaintre, Valentin et al., "Guided Fine-Tuning for Large-Scale Material Transfer", Cornell University arXiv, arXiv.org [retrieved Mar. 24, 2023]. Retrieved from the Internet <https://arxiv.org/pdf/2007.03059.pdf>., Jul. 8, 2020, 15 Pages.
Deschaintre, Valentin et al., "Single-Image SVBRDF Capture with a Rendering-Aware Deep Network", Cornell University arXiv, arXiv.org [retrieved Mar. 24, 2023]. Retrieved from the Internet <https://arxiv.org/pdf/1810.09718.pdf>., Oct. 23, 2018, 15 Pages.
Deussen, Oliver et al., "Realistic modeling and rendering of plant ecosystems", SIGGRAPH '98: Proceedings of the 25th annual conference on Computer graphics and interactive techniques [retrieved May 11, 2023]. Retrieved from the Internet <https://doi.org/10.1145/280814.280898>, Jul. 1998, 12 pages.
Du, Tao et al., "InverseCSG: automatic conversion of 3D models to CSG trees", ACM Transactions on Graphics, vol. 37, No. 6 [retrieved from the Internet <https://doi.org/10.1145/3272127.3275006>, Dec. 2018, 16 pages.
Ellis, Kevin et al., "Learning to Infer Graphics Programs from Hand-Drawn Images", Advances in neural information processing systems 31 [retrieved Mar. 24, 2023]. Retrieved from the Internet <https://par.nsf.gov/servlets/purl/10088909>., Dec. 2017, 10 pages.
Ellis, Kevin et al., "Write, Execute, Assess: Program Synthesis with a REPL", Advances in Neural Information Processing Systems 32 [retrieved Mar. 24, 2023]. Retrieved from the Internet <https://proceedings.neurips.cc/paper_files/paper/2019/file/50d2d2262762648589b1943078712aa6-Paper.pdf>., Dec. 8, 2019, 10 Pages.
Fish, Noa et al., "Meta-representation of Shape Families", ACM Transactions on Graphics, vol. 33, No. 4 [retrieved Dec. 16, 2022]. Retrieved from the Internet <https://doi.org/10.1145/2601097.2601185>, Jul. 2014, 11 pages.
Ganin, Yaroslav et al., "Synthesizing Programs for Images using Reinforced Adversarial Learning", arXiv Preprint, arXiv.org [retrieved Mar. 25, 2023]. Retrieved from the Internet <https://arxiv.org/pdf/1804.01118.pdf>., Apr. 3, 2018, 12 pages.
Gao, Duan et al., "Deep inverse rendering for high-resolution SVBRDF estimation from an arbitrary number of images", ACM Transactions on Graphics, vol. 38, No. 4 [retrieved Mar. 25, 2023]. Retrieved from the Internet <https://gao-duan.github.io/publications/mvsvbrdf/mvsvbrdf_low_resolution.pdf>., Jul. 12, 2019, 15 Pages.
Guarnera, Dar'ya et al., "BRDF Representation and Acquisition", 37th Annual Conference of the European Association for Computer Graphics: State of the Art Reports [retrieved Mar. 25, 2023]. Retrieved from the Internet <https://eprints.whiterose.ac.uk/161383/1/BRDF_representation_and_acquisition_preprint.pdf>., May 9, 2016, 27 Pages.
Guehl, P , "Semi-Procedural Textures Using Point Process Texture Basis Functions", Computer Graphics Forum, vol. 39, No. 4 [retrieved Mar. 23, 2023]. Retrieved from the Internet <https://publis.icube.unistra.fr/docs/14547/semiproctex_supplemental_4.pdf>., Jul. 20, 2020, 6 Pages.
Guerrero, Paul et al., "MatFormer: A Generative Model for Procedural Materials", Cornell University arXiv, arXiv.org [retrieved Mar. 25, 2023]. Retrieved from the Internet <https://arxiv.org/pdf/2207.01044.pdf>., Aug. 15, 2022, 12 Pages.
Guo, Jie et al., "Highlight-Aware Two-Stream Network for Single-Image SVBRDF Acquisition", ACM Transactions on Graphics, vol. 40, No. 4 [retrieved Apr. 10, 2023]. Retrieved from the Internet <https://sites.cs.ucsb.edu/~lingqi/publications/paper_highlight.pdf>., Jul. 19, 2021, 14 Pages.
Guo, Y. et al., "A Bayesian Inference Framework for Procedural Material Parameter Estimation", Cornell University arXiv, arXiv.org [retrieved Mar. 25, 2023]. Retrieved from the Internet <https://arxiv.org/pdf/1912.01067.pdf>., Nov. 4, 2020, 12 Pages.
Guo, Yu et al., "MaterialGAN: Reflectance Capture using a Generative SVBRDF Model", Cornell University arXiv, arXiv.org [retrieved Mar. 25, 2023]. Retrieved from the Internet <https://arxiv.org/pdf/2010.00114.pdf>., Sep. 30, 2020, 13 Pages.

(56)        References Cited

OTHER PUBLICATIONS

Heitz, Eric et al., "A Sliced Wasserstein Loss for Neural Texture Synthesis", Cornell University arXiv, arXiv.org [retrieved Mar. 27, 2023]. Retrieved from the Internet <https://arxiv.org/pdf/2006.07229. pdf>., Mar. 11, 2021, 9 Pages.

Henzler, Philipp et al., "Generative Modelling of BRDF Textures from Flash Images", Cornell University arXiv, arXiv.org [retrieved Mar. 25, 2023]. Retrieved from the Internet <https://arxiv.org/pdf/ 2102.11861.pdf>., Sep. 10, 2021, 13 Pages.

Hu, Yiwei et al., "A novel framework for inverse procedural texture modeling", ACM Transactions on Graphics, vol. 38, No. 6 [retrieved Mar. 25, 2023]. Retrieved from the Internet <https://graphics.cs. yale.edu/sites/default/files/inverse_procedural_texture_modeling_ low-res_0.pdf>., Nov. 8, 2019, 14 Pages.

Hu, Yiwei et al., "An Inverse Procedural Modeling Pipeline for SVBRDF Maps", Cornell University arXiv, arXiv.org [retrieved Mar. 25, 2023]. Retrieved from the Internet <https://arxiv.org/pdf/ 2109.06395.pdf>., Sep. 27, 2021, 17 Pages.

Hu, Yiwei et al., "Controlling Material Appearance by Examples", Cornell University arXiv, arXiv.org [retrieved Mar. 28, 2023]. Retrieved from the Internet <https://arxiv.org/pdf/2206.14970. pdf>., Jun. 30, 2022, 12 Pages.

Hu, Yiwei et al., "Node Graph Optimization Using Differentiable Proxies", SIGGRAPH '22: ACM SIGGRAPH 2022 Conference Proceedings [retrieved Mar. 25, 2023]. Retrieved from the Internet <https://arxiv.org/pdf/2207.07684.pdf>., Jul. 24, 2022, 9 Pages.

Hu, Yuanming et al., "Exposure: A White-Box Photo Post-Processing Framework", ACM Transactions on Graphics, vol. 37, No. 2 [retrieved Mar. 25, 2023]. Retrieved from the Internet <https://web.archive.org/web/20200322160403id_/https://www. microsoft.com/en-us/research/uploads/prod/2018/01/Exposure. pdf>., Feb. 6, 2018, 23 pages.

Huang, Haibin , "Deep-Learned Generative Representations Of 3D Shape Families", University of Massachusetts Amherst, College of Information and Computer Sciences [retrieved May 12, 2023]. Retrieved from the Internet <https://brotherhuang.github.io/files/ thesis_lowres.pdf>, Sep. 2017, 143 pages.

Huang, Haibin et al., "Shape Synthesis from Sketches via Procedural Models and Convolutional Networks", IEEE Transactions On Visualization and Computer Graphics. vol. 23, No. 8,, 2017, 11 pages.

Johnson, Justin et al., "Inferring and Executing Programs for Visual Reasoning", Cornell University arXiv, arXiv.org [retrieved Mar. 25, 2023]. Retrieved from the Internet <https://arxiv.org/pdf/1705.03633. pdf>., May 10, 2017, 13 Pages.

Jones, R. Kenny et al., "ShapeAssembly: Learning to Generate Programs for 3D Shape Structure Synthesis", Cornell University arXiv, arXiv.org [retrieved Mar. 25, 2023]. Retrieved from the Internet <https://arxiv.org/pdf/2009.08026.pdf>., Sep. 17, 2020, 20 Pages.

Kania, Kacper et al., "UCSG-Net—Unsupervised Discovering of Constructive Solid Geometry Tree", Advances in Neural Information Processing Systems 33 [retrieved Mar. 25, 2023]. Retrieved from the Internet <https://proceedings.neurips.cc/paper/2020/file/ 63d5fb54a858dd033fe90e6e4a74b0f0-Paper.pdf>., Jun. 2020, 11 Pages.

Kingma, Diederik P. et al., "Adam: A Method for Stochastic Optimization", Cornell University, arXiv Preprint, arXiv.org [retrieved Oct. 9, 2023]. Retrieved from the Internet <https://arxiv.org/pdf/ 1412.6980.pdf>., Jan. 30, 2017, 15 pages.

Krs, Vojtech et al., "PICO: Procedural Iterative Constrained Optimizer for Geometric Modeling", IEEE Transactions on Visualization and Computer Graphics [retrieved on Oct. 2, 2020]. Retrieved from the Internet <https://ieeexplore.ieee.org/document/9095367>., May 18, 2020,.

Leyk, Stefan et al., "A Conceptual Framework for Uncertainty Investigation in Map-based Land Cover Change Modelling", Transactions in GIS, vol. 9, No. 3 [retrieved May 12, 2021]. Retrieved from the Internet <https://doi.org/10.1111/j.1467-9671.2005.00220. x>, May 17, 2005, 32 pages.

Li, Xiao et al., "Modeling Surface Appearance from a Single Photograph using Self-augmented Convolutional Neural Networks", Cornell University arXiv, arXiv.org [retrieved Mar. 25, 2023]. Retrieved from the Internet <https://arxiv.org/pdf/1809.00886. pdf>., Sep. 4, 2018, 11 Pages.

Lipp, Markus et al., "Local Editing of Procedural Models", Wiley Online Library, Computer Graphics Forum vol. 38, Issue 2, [retrieved on Oct. 2, 2020]. Retrieved from the Internet <https://doi.org/10. 1111/cgf.13615>., Jun. 7, 2019, 13 pages.

Liu, Albert Julius et al., "Simulating the Structure and Texture of Solid Wood", ACM Transactions on Graphics, vol. 35, No. 6 [retrieved Mar. 25, 2023]. Retrieved from the Internet <http://www. cs.cornell.edu/projects/wood/simulating_the_structure_and_texture_ of_solid_wood.pdf>., 11 Pages.

Lu, Sidi et al., "Neurally-Guided Structure Inference", Cornell University arXiv, arXiv.org [retrieved Mar. 25, 2023]. Retrieved from the Internet <http://128.84.21.203/pdf/1906.07304>., Aug. 15, 2019, 11 Pages.

Nishida, Gen et al., "Interactive Sketching of Urban Procedural Models", ACM Trans. Graph., vol. 35, No. 4, Article 130, 2016, 11 pages.

Radford, Alec et al., "Learning Transferable Visual Models From Natural Language Supervision", Cornell University arXiv, arXiv. org [retrieved Jun. 29, 2023]. Retrieved from the Internet <https:// arxiv.org/pdf/2103.00020.pdf>., Feb. 26, 2021, 48 Pages.

Ramesh, Aditya et al., "Hierarchical Text-Conditional Image Generation with CLIP Latents", Cornell University arXiv, arXiv.org [retrieved Aug. 11, 2023]. Retrieved from the Internet <https://arxiv. org/pdf/2204.06125.pdf>., Apr. 13, 2022, 27 Pages.

Rombach, Robin et al., "High-Resolution Image Synthesis with Latent Diffusion Models", Cornell University arXiv, arXiv.org [retrieved Aug. 11, 2023]. Retrieved from the Internet <https://arxiv. org/pdf/2112.10752.pdf>., Apr. 13, 2022, 45 Pages.

Sharma, Gopal et al., "CSGNet: Neural Shape Parser for Constructive Solid Geometry", arXiv Preprint, Cornell University, arXiv.org [retrieved Mar. 25, 2023]. Retrieved from the Internet <https://arxiv. org/pdf/1712.08290.pdf>., Mar. 31, 2018, 16 pages.

Shi, Liang et al., "Match: differentiable material graphs for procedural material capture", Association for Computing Machinery [retrieved Mar. 25, 2023]. Retrieved from the Internet <https:// dspace.mit.edu/handle/1721.1/134067>., 2020, 16 Pages.

Št'ava, O. et al., "Inverse Procedural Modeling by Automatic Generation of L-systems", Computer Graphics Forum, vol. 29, No. 2 [retrieved Mar. 25, 2023]. Retrieved from the Internet <https:// citeseerx.ist.psu.edu/document?repid=rep1&type=pdf&doi= a70b4ca28dd43b0747d0692aff2c5d645b4f6414>., Jun. 7, 2010, 10 Pages.

Tian, Yonglong et al., "Learning to Infer and Execute 3D Shape Programs", Cornell University arXiv, arXiv.org [retrieved Mar. 25, 2023]. Retrieved from the Internet <https://arxiv.org/pdf/1901.02875. pdf>., Aug. 9, 2019, 21 Pages.

Vaswani, Ashish et al., "Attention Is All You Need", Cornell University arXiv Preprint, arXiv.org [retrieved Aug. 9, 2023]. Retrieved from the Internet <https://arxiv.org/pdf/1706.03762. pdf>., Dec. 6, 2017, 15 pages.

Vinyals, Oriol et al., "Pointer Networks", Advances in Neural Information Processing Systems 28 [retrieved Mar. 25, 2023]. Retrieved from the Internet <https://proceedings.neurips.cc/paper_ files/paper/2015/file/29921001f2f04bd3baee84a12e98098f-Paper. pdf>., Jan. 2, 2017, 9 Pages.

Walke, Homer et al., "Learning to Infer Shape Programs Using Latent Execution Self Training", Cornell University arXiv, arXiv. org [retrieved Mar. 25, 2023]. Retrieved from the Internet <https:// arxiv.org/pdf/2011.13045v1.pdf>., Nov. 25, 2020, 15 Pages.

Walter, Bruce et al., "Microfacet Models for Refraction through Rough Surfaces", Proceedings of the 18th Eurographics Conference on Rendering Techniques, EGSR'07, Goslar, DEU, Eurographics Association [retrieved on Mar. 28, 2023]. Retrieved from the Internet <shorturl.at/hDEJ1>., Jun. 2007, 12 pages.

Wu, Chenming et al., "Carpentry compiler", ACM Transactions on Graphics, vol. 38, No. 6 [retrieved Mar. 25, 2023]. Retrieved from the Internet <https://grail.cs.washington.edu/wp-content/uploads/ 2019/11/wu2019cc.pdf>., 14 Pages.

(56) References Cited

OTHER PUBLICATIONS

Xu, Xianghao et al., "Inferring CAD Modeling Sequences Using Zone Graphs", Cornell University arXiv, arXiv.org [retrieved Mar. 25, 2023]. Retrieved from the Internet <http://128.84.21.203/pdf/2104.03900>., Apr. 20, 2021, 20 Pages.

Ye, Wenjie et al., "Deep Reflectance Scanning: Recovering Spatially-varying Material Appearance from a Flash-lit Video Sequence", Computer Graphics Forum, vol. 40, No. 6 [retrieved Mar. 25, 2023]. Retrieved from the Internet <https://par.nsf.gov/servlets/purl/10338728>., Aug. 18, 2021, 18 Pages.

Yumer, Mehmet E. et al., "Procedural Modeling Using Autoencoder Networks", UIST '15: Proceedings of the 28th Annual ACM Symposium on User Interface Software & Technology [retrieved Dec. 16, 2022]. Retrieved from the Internet <https://doi.org/10.1145/2807442.2807448>, Nov. 5, 2015, 10 pages.

Zhou, Xilong et al., "Adversarial Single-Image SVBRDF Estimation with Hybrid Training", Computer Graphics Forum, vol. 40, No. 2 [retrieved Mar. 25, 2023]. Retrieved from the Internet <https://people.engr.tamu.edu/nimak/Data/EG21_SVBRDF_LoRes.pdf>., Jun. 4, 2021, 11 Pages.

Zhou, Xilong et al., "TileGen: Tileable, Controllable Material Generation and Capture", Cornell University arXiv, arXiv.org [retrieved Mar. 25, 2023]. Retrieved from the Internet <https://arxiv.org/pdf/2206.05649.pdf>., Jun. 20, 2022, 18 Pages.

* cited by examiner

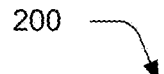
200
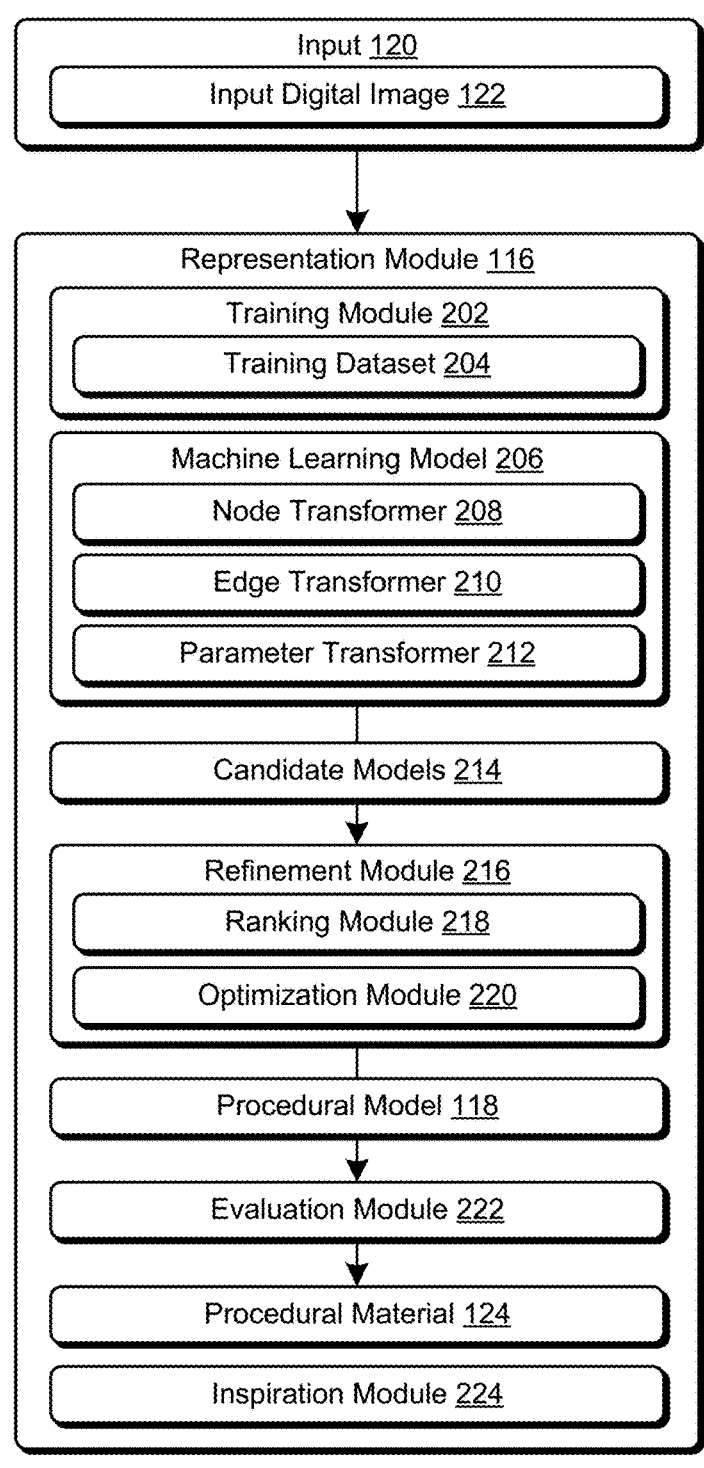
*Fig. 2*

300b

302

Representation Module 116

308

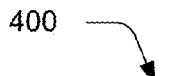
400
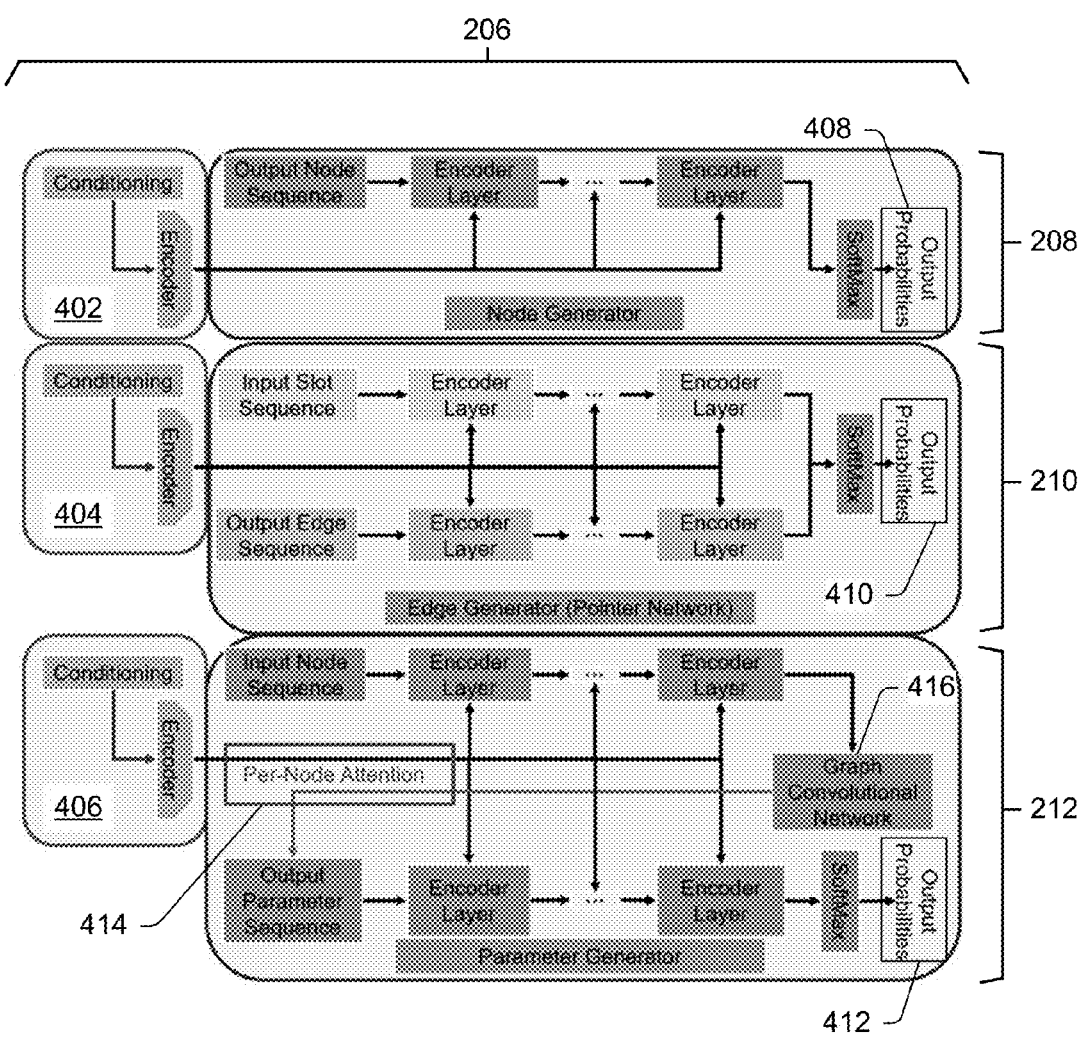
*Fig. 4*

800
802
806
810
812
808
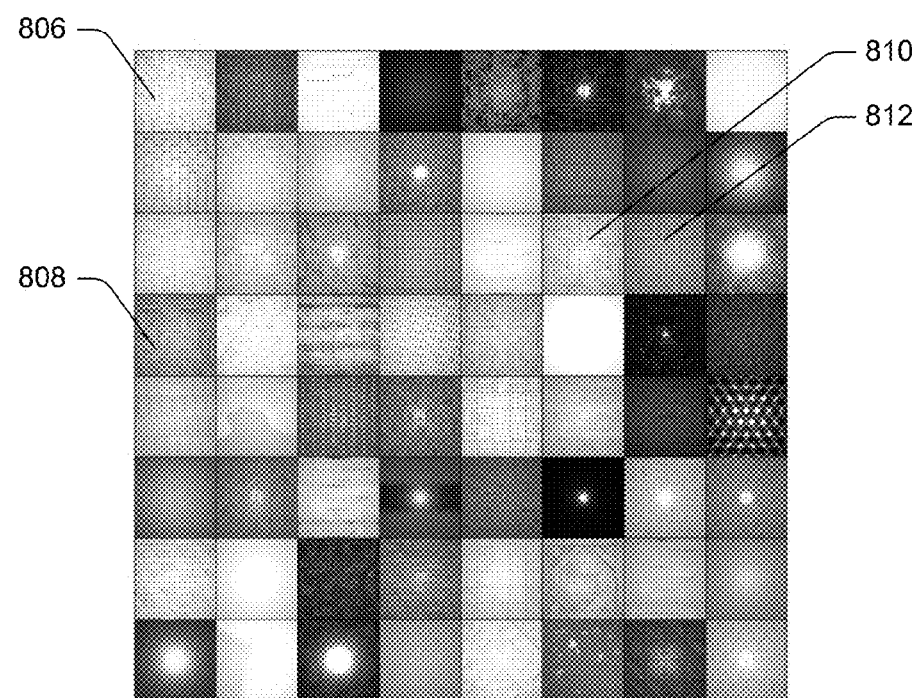
804
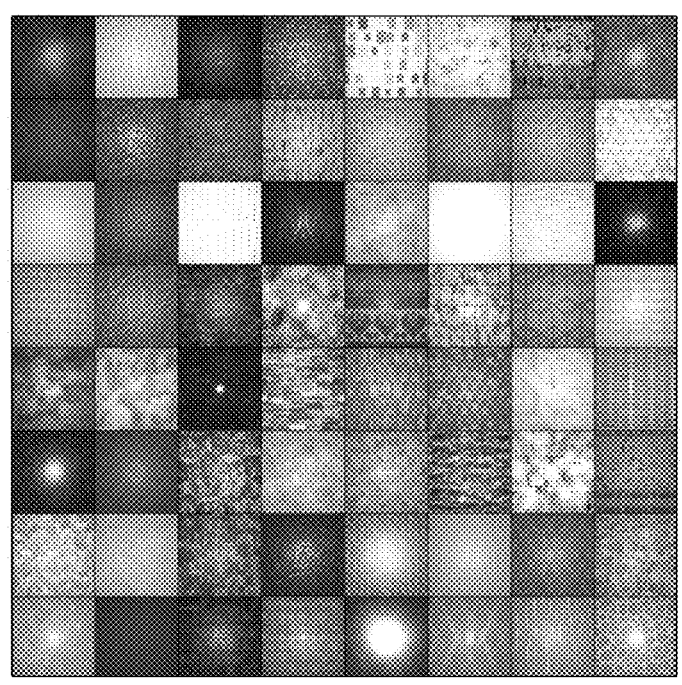
*Fig. 8*

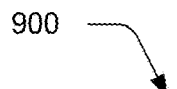

900

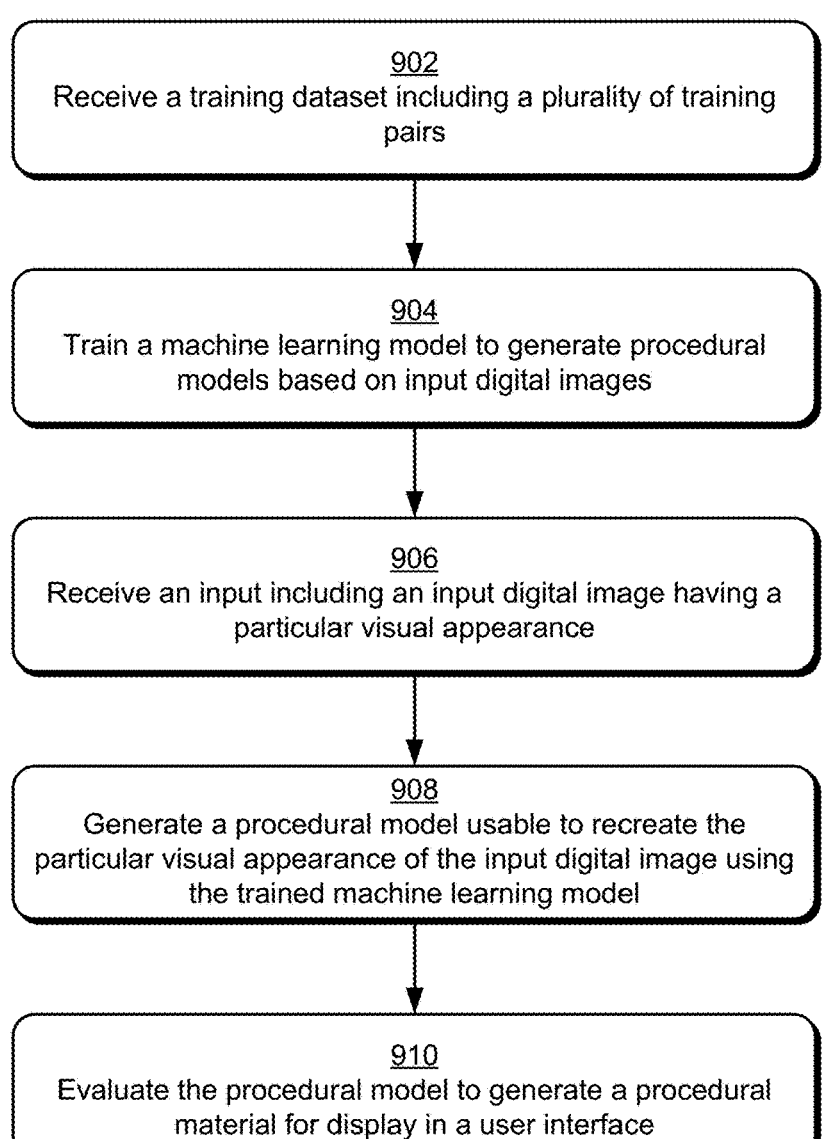

902
Receive a training dataset including a plurality of training pairs

904
Train a machine learning model to generate procedural models based on input digital images 906
Receive an input including an input digital image having a particular visual appearance 908
Generate a procedural model usable to recreate the particular visual appearance of the input digital image using the trained machine learning model 910
Evaluate the procedural model to generate a procedural material for display in a user interface

*Fig. 9*

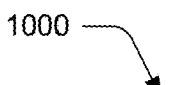

1000 ⟶

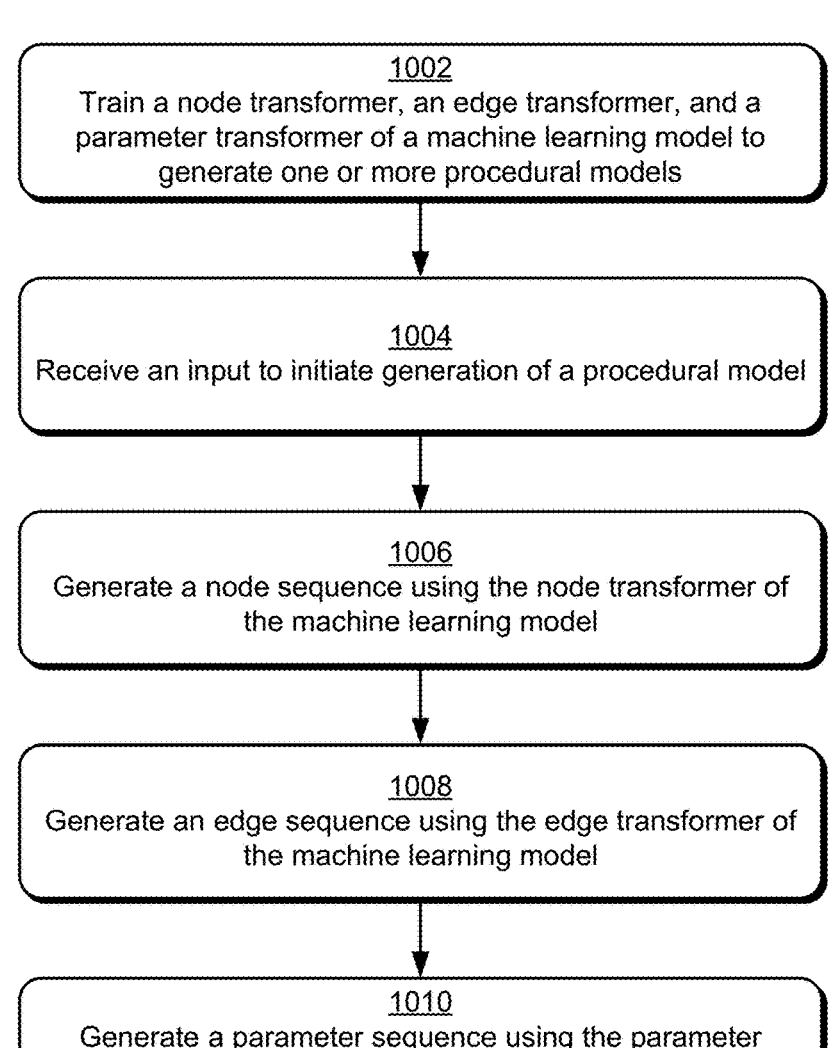

---

1002
Train a node transformer, an edge transformer, and a parameter transformer of a machine learning model to generate one or more procedural models

---

1004
Receive an input to initiate generation of a procedural model

---

1006
Generate a node sequence using the node transformer of the machine learning model

---

1008
Generate an edge sequence using the edge transformer of the machine learning model

---

1010
Generate a parameter sequence using the parameter transformer based on the node sequence and the edge sequence

---

1012
Generate the procedural model based on the node sequence, the edge sequence, and the parameter sequence

1100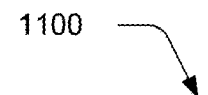
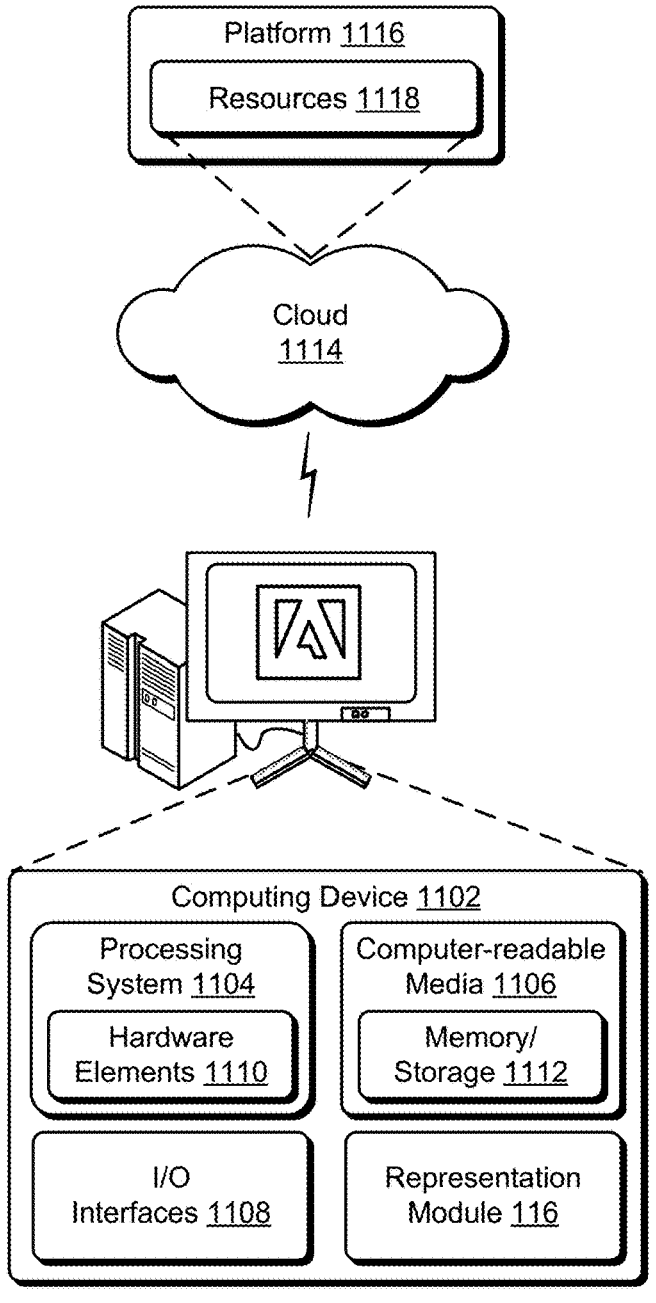
Platform 1116
Resources 1118
Cloud
1114
Computing Device 1102
Processing
System 1104
Hardware
Elements 1110
Computer-readable
Media 1106
Memory/
Storage 1112
I/O
Interfaces 1108
Representation
Module 116
*Fig. 11*

CONDITIONAL PROCEDURAL MODEL GENERATION

BACKGROUND

Procedurally generated materials, e.g., digital materials that are defined algorithmically rather than drawn by an artist, are often used for digital content design to create realistic environments or scenes in a digital context. Procedurally generated materials have a number of advantages including tileability, resolution independence, responsiveness to simulated lighting conditions, and editability. Accordingly, procedurally generated materials have a wide range of applications such as in video games, animation, virtual reality, augmented reality, etc. Conventional approaches to author procedurally generated materials involve a user interactively and manually adjusting various features of the procedural material until the user is satisfied with the result. These conventional techniques enable a high degree of user control, however, are time consuming, inefficient, and limited by the user's experience. Although some conventional techniques support random creation of procedurally generated materials, these approaches negate fine-tuned user control and limit creative capabilities.

SUMMARY

Techniques for conditional procedural model generation are described that support generation of procedural models based on visual features of input images. In an example, a computing device implements a content processing system to receive a training dataset that includes a plurality of training pairs. The training pairs include a training procedural model as well as a corresponding training target image. Using the training dataset, the content processing system trains a machine learning model to generate procedural models based on input images. The content processing system then receives an input image that has a particular visual appearance, e.g., depicts a particular digital texture, digital pattern, digital material, etc. The content processing system leverages the trained machine learning model to generate a procedural model based on the input image. The procedural model, for instance, is a node graph that includes a sequence of parametrized nodes connected by one or more edges that is usable to recreate the particular visual appearance of the input digital image. In this way, the techniques described herein enable efficient generation of procedural models based on visual properties of input digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a representation module of FIG. 1 in greater detail.

FIG. 4 depicts an example of an architecture of a machine learning model to perform conditional procedural model generation.

FIG. 8 depicts a representation of generation of inspiration procedural materials.

FIG. 9 depicts a procedure in an example implementation of conditional procedural model generation.

FIG. 10 depicts a procedure in an example implementation of procedural model generation including generation of inspiration procedural models.

FIG. 11 illustrates an example system including various components of an example device that can be implemented as any type of computing device as described and/or utilized with reference to FIGS. 1-10 to implement embodiments of the techniques described herein.

DETAILED DESCRIPTION

Overview

Figure 1:
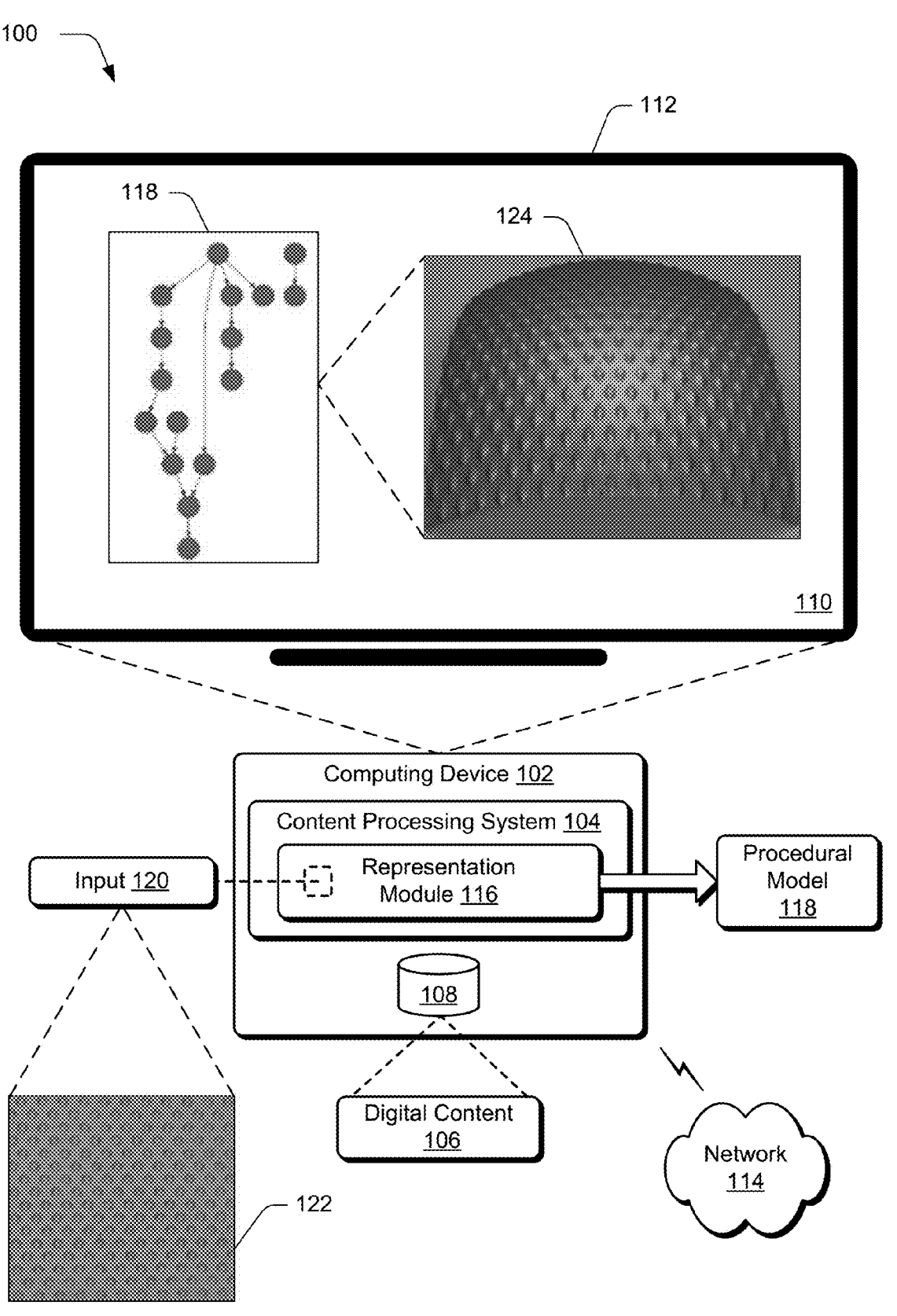
FIG. 1 is an illustration of an environment in an example implementation that is operable to employ conditional procedural model generation techniques as described herein.

Content processing systems often use procedurally generated materials to impart a unique style and customizations to objects or scenes included as part of digital content. For instance, procedurally generated materials are leveraged to create a variety of digital material appearances, and thus support complex editing and digital design operations. In some examples, procedurally generated materials are represented by procedural models such as "node graphs." These node graphs are a frequently used visual programming modality for material design, and include parametrized nodes defining various image transformations that are connected by edges, which define an information flow of the node graph. Conventional authoring of procedural models using node graphs involves manual editing by a user of the nodes, node parameters, and edges. However, due to the inherent complexity of the node graphs, conventional authoring is time-consuming, computationally inefficient, and limited by the user's experience.

Accordingly, several techniques have been proposed that support random generation of procedural models. However, such conventional techniques are prone to bias and thus generate procedural models with limited diversity. Further, these techniques fail to consider features of reference digital content which limits creative applications. For instance, in various examples it is desirable to impart visual properties from reference digital content, e.g., "real world" reference materials, to a procedural model. Other conventional techniques attempt to generate material representations using pixel or bitmap representations, however these approaches forgo the advantageous properties of procedural models. Thus, a user relying on conventional techniques is forced to manually author a procedural material to replicate an appearance of the reference digital content. Such techniques are time-consuming and computationally inefficient, and often do not accurately resemble the visual properties of the reference digital content.

Accordingly, techniques and systems for conditional procedural model generation are described that overcome these challenges and limitations to generate procedural models based on input digital content, e.g., an input image. In this way, the techniques described herein enable efficient generation of procedural models that are able to represent a variety of textures, patterns, materials, etc. automatically and without significant user intervention. This overcomes limitations of conventional techniques, which are limited to manual authoring of procedural models or random generation of procedural models with limited diversity.

Consider an example in which a user designs a digital scene in a three-dimensional modeling application. The digital scene depicts a room, and the user desires to apply a digital texture to a wall in the room. In particular, the user wishes to make the wall in the digital scene "look like" a wooden chess board that is in the user's real-world office. Using conventional approaches, the user would be forced to manually author a procedural model to attempt to recreate a visual appearance of the chess board, which would be time consuming, computationally inefficient, and subject to the experience of the user.

To overcome the limitations of conventional techniques, a processing device implements a content processing system to generate procedural models based on visual properties of input digital content, e.g., an input image. To do so, the content processing system receives a training dataset that includes a plurality of training pairs. Each training pair includes a training procedural model and a corresponding training target image. Using the training target images as inputs and the training procedural models as ground truths, the content processing system trains a machine learning model to generate procedural models that are based on an input image. The procedural models, for instance, are node graphs that are generated as a sequence of nodes, a sequence of edges, and a sequence of parameters.

The machine learning model includes one or more transformers, such as a node transformer, an edge transformer, and a parameter transformer. Thus, training the machine learning model includes training the node transformer, the edge transformer, and the parameter transformer to generate respective aspects of the procedural models (e.g., the sequences of nodes, edges, and parameters) conditional on input images. Training in this way ensures that generation of each constituent component of the node graph is based on visual properties of input images, which is not possible using conventional techniques.

Once the machine learning model is trained, the content processing system receives an input that includes an input digital image having a particular visual appearance. The input digital image is configurable in a variety of ways, such as a JPEG, PNG, GIF, raster image, vector image, etc. Generally, the particular visual appearance includes one or more visual properties of a material depicted by the input digital image such as a color, texture, reflectivity, surface roughness, presence of one or more patterns of the material, etc. Continuing the above example, the input digital image depicts the wooden chess board from the user's office and has a particular texture, pattern, and color scheme.

Based on the input image, the content processing system generates a procedural model that is usable to recreate the particular visual appearance of the input digital image using the trained machine learning model. The procedural model, for instance, is a node graph that includes parametrized nodes connected by one or more edges to represent one or more of a digital texture, digital pattern, or a digital material of the input digital image. The nodes define various image transformations, while the edges define a flow of information for the node graph. Generation of the procedural model includes generation of a sequence of nodes, a sequence of edges, and a sequence of parameters by the machine learning model.

For instance, the machine learning model leverages the node transformer to generate a node sequence based on the input digital image. The edge transformer generates an edge sequence based on the input digital image as well as the node sequence. The parameter transformer generates a parameter sequence, e.g., parameters for each respective node, based on the input digital image, the node sequence, and the edge sequence. In this way, the nodes, edges, and parameters of the procedural model are each based on features of the input digital image, and the parameter sequence is further based on a local context of each node within the node graph which is not possible using conventional techniques. Continuing with the example, the procedural model generated by the machine learning model is usable to recreate the particular visual appearance of the image of the wooden chess board.

Once generated, the content processing system is able to "evaluate" the procedural model, such as to render a procedural material for display in a user interface. In the example, the content processing system evaluates the procedural model to generate a procedural material that has the particular visual appearance of the wooden chess board. Accordingly, the user is able to perform a variety of editing and/or design operations using the procedural model, such as to apply the particular visual appearance of the chess board to the wall in the digital scene. In this way, the techniques described herein overcome conventional techniques to support automatic generation of a procedural model that is usable to recreate a particular visual appearance of an input image, which results in increased computational efficiency and an enhanced user experience. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the conditional procedural model generation techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as a representation module 116. The representation module 116 is configured to generate a procedural model 118, for instance based on visual properties of one or more reference images. For instance, in the illustrated example the representation module 116 receives an input 120 that includes an input digital image 122. The input digital image 122 is configurable in a variety of ways and/or file formats, such as a JPEG, PNG, GIF, raster image, vector image, etc. In this example, the input digital image 122 depicts a material having a particular visual appearance, such as a dimpled, metallic, golden surface that a user of the computing device 102 wishes to represent as a procedural model 118.

The representation module 116 is operable to generate the procedural model 118 to recreate the particular visual appearance of the input digital image 122, for instance using a machine learning model. In this example, the procedural model 118 is a node graph that includes a sequence of parametrized nodes that are connected by various edges. In the illustrated example, the nodes of the node graph are depicted as green circles and represent various image transformations. The edges are depicted as connections between the nodes and define an information flow for the node graph.

The representation module 116 is further operable to evaluate the node graph, such as to generate a procedural material 124 based on the procedural model 118. As depicted, the procedural material 124 includes the particular visual appearance of the input digital image 122, e.g., the dimpled, metallic, golden surface. In this way, the procedural material 124 is generated based on visual features of the input digital image 122 and is usable in subsequent three-dimensional design applications and/or operations. This overcomes the limitations of conventional techniques, which rely on random procedural model generation or require time-intensive manual authoring of procedural models. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Conditional Procedural Model Generation

Figure 3A:
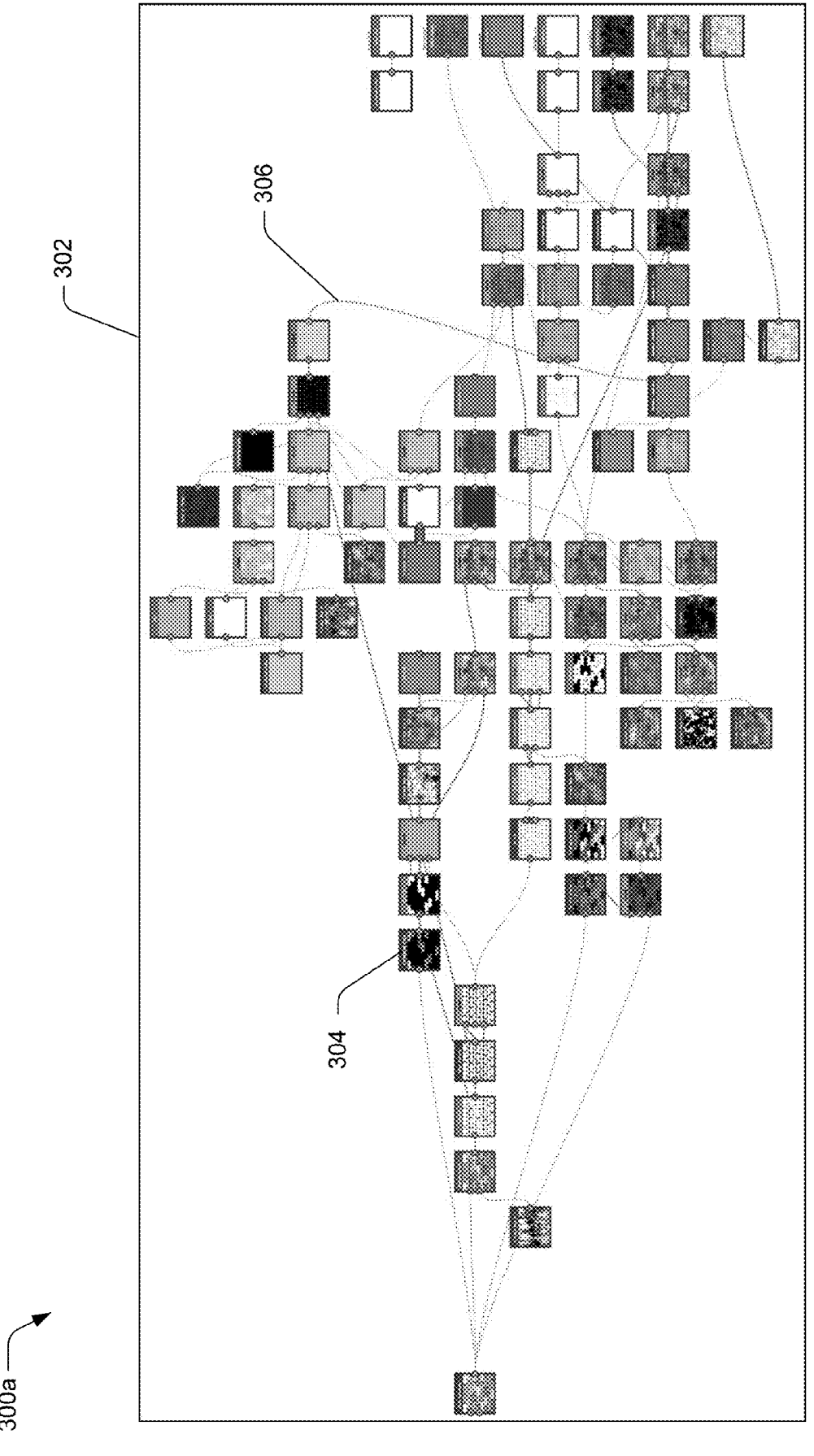
FIGS. 3*a* and 3*b* depict examples of a procedural model including a node graph.
Figure 3B:
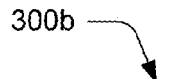
Figure 5:
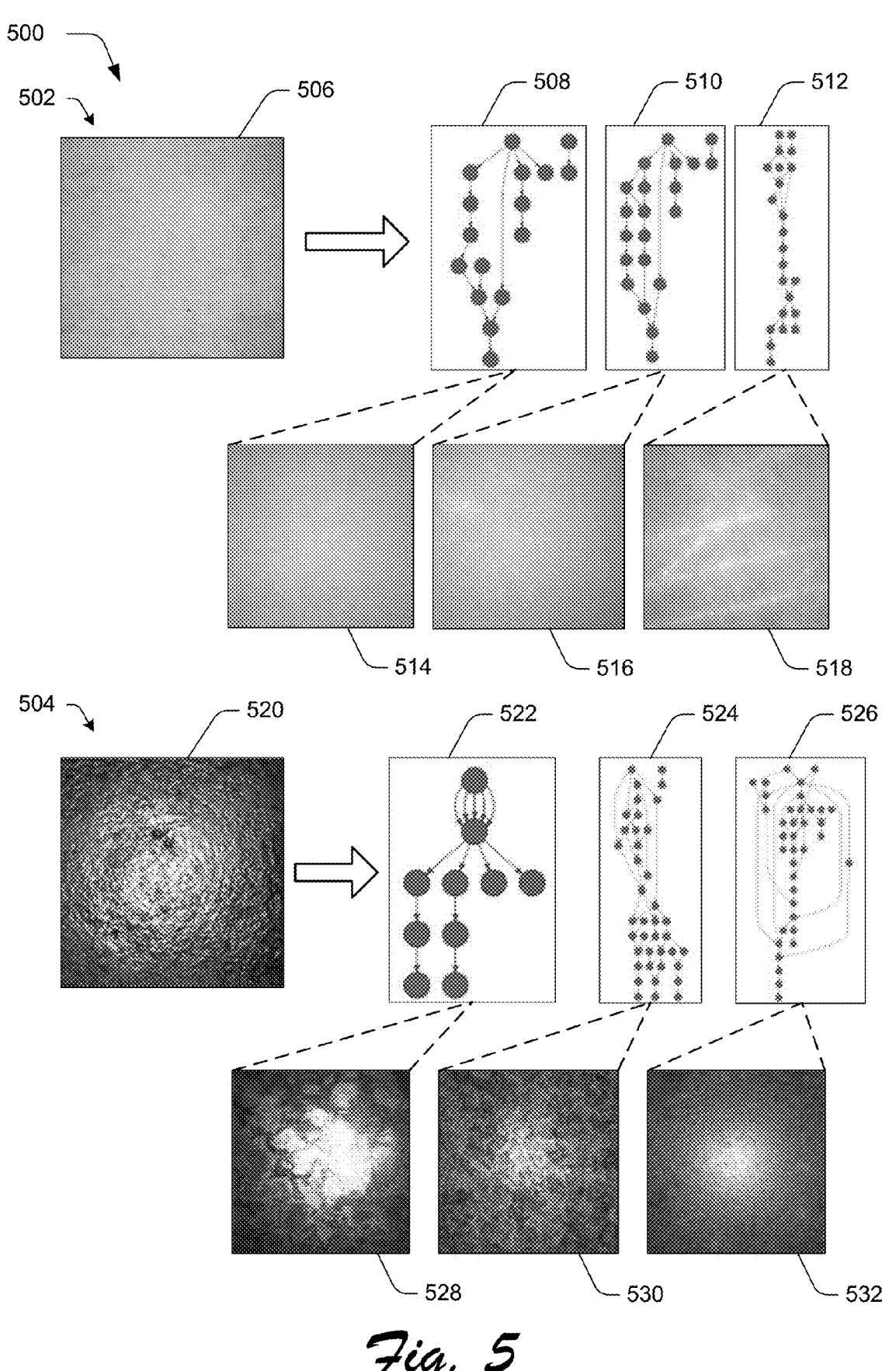
FIG. 5 depicts an example of generation of procedural models based on input images.
Figure 6:
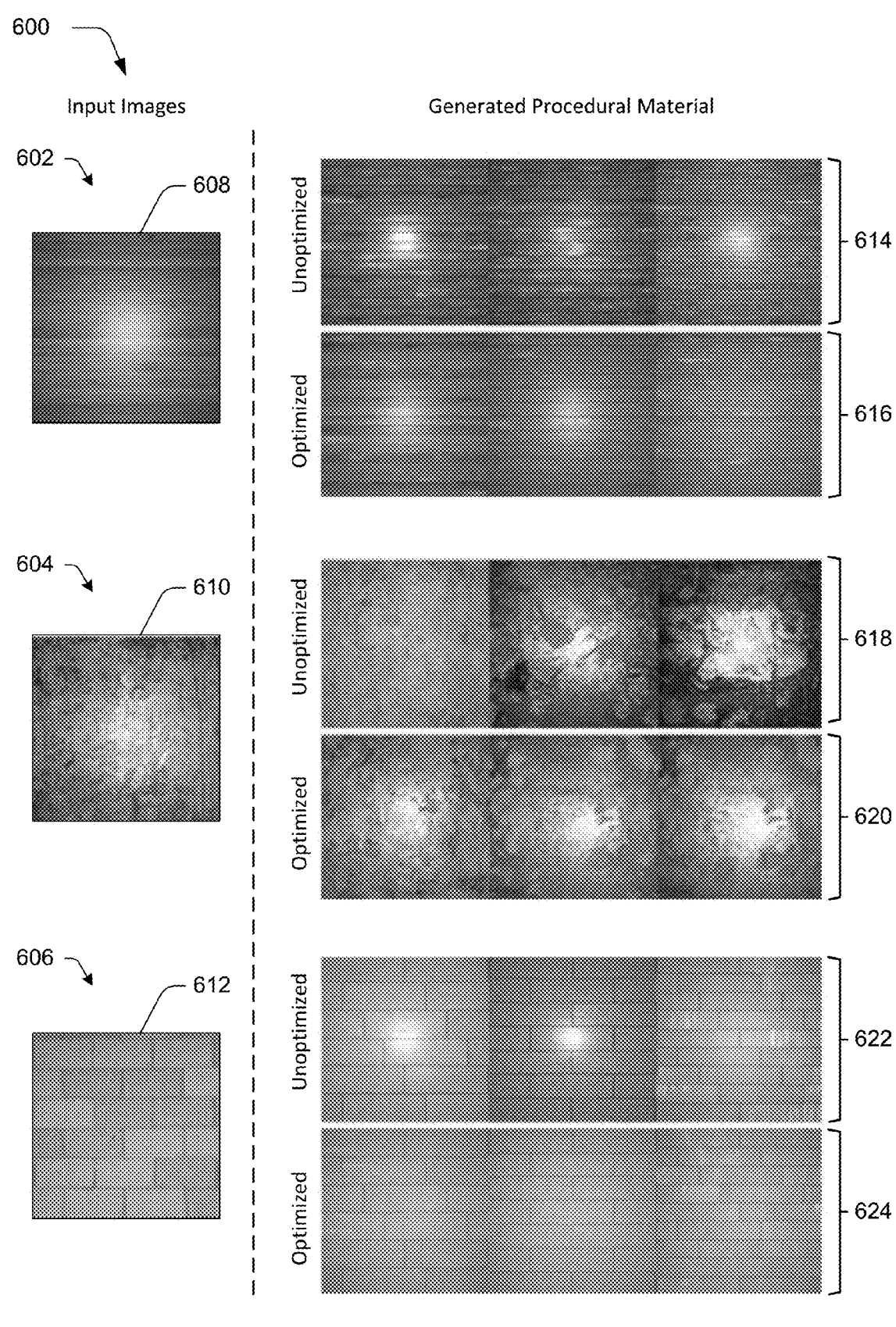
FIG. 6 depicts an example of optimization techniques for conditional procedural model generation.
Figure 7:
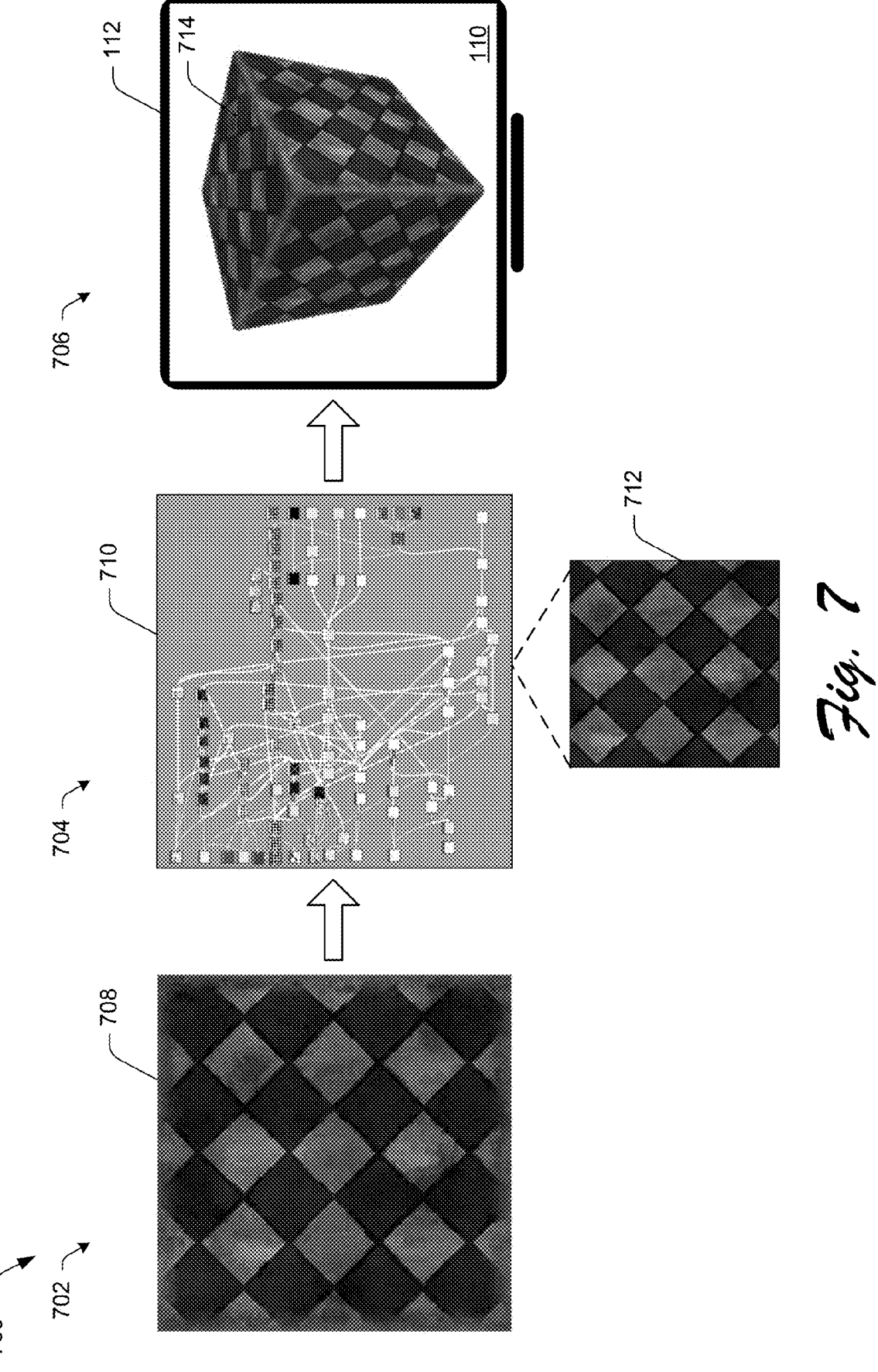
FIG. 7 depicts an example of conditional procedural model generation to generate a procedural material in a user interface.

FIG. 2 depicts a system 200 in an example implementation showing operation of a representation module 116 of FIG. 1 in greater detail. FIGS. 3a and 3b depict examples 300a, 300b of a procedural model including a node graph. FIG. 4 depicts an example 400 of an architecture of a machine learning model to perform conditional procedural model generation. FIG. 5 depicts an example 500 of procedural model generation based on input images. FIG. 6 depicts an example 600 of optimization techniques for conditional procedural model generation. FIG. 7 depicts an example 700 of conditional procedural model generation to generate a procedural material in a user interface. FIG. 8 depicts a representation 800 of generation of inspiration procedural materials. FIG. 9 depicts a procedure 900 in an example implementation of conditional procedural model generation. FIG. 10 depicts a procedure 1000 in an example implementation of procedural model generation including generation of inspiration procedural models.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8 and in parallel to the procedure 900 of FIG. 9 and the procedure 1000 of FIG. 10.

FIG. 2 depicts a system 200 in an example implementation showing operation of a representation module 116 in greater detail. Generally, the representation module 116 is configured to perform conditional procedural model generation, e.g., generation of a procedural model 118 based on an input digital image 122. In various examples, the procedural model 118 is a node graph that includes a sequence of parametrized nodes connected by edges.

An example representation of a node graph 302 for a procedural model 118 is depicted in FIGS. 3a and 3b. The node graph 302, for instance, includes a variety of nodes connected by one or more edges in a nonlinear manner. In the illustrated example, the nodes are depicted as boxes, such as an example node 304, while edges are depicted as the connections between the nodes, such as an example edge 306. Generally, the nodes define functions such as image transformations (e.g., sharpen, directional warp, highpass greyscale, blur, blend, pattern, etc.) while the edges define an informational "flow" for the node graph. In an example, the nodes include one or more generation functions to create a signal and/or one or more filter functions to manipulate a signal. The nodes are further defined by one or more parameters that control various properties of a respective function, e.g., various properties of a respective image transformation.

In this example, the node graph 302 is representable as $g=(N, E)$ where $N=(n_1, n_2, \ldots)$ represents the nodes and $E=(e_1, e_2, \ldots)$ represents the edges. An example node $n_i=(\tau_i, P_i)$ is defined by an operation type $\tau_i$, e.g., a type of image transformation, and a set of node parameters $P_i=(p_1^i, p_2^i, \ldots)$ that control various aspects of the operation. In some examples, individual node parameters $p_j^i$ include one or more of an integer, float, string, a fixed-length array, and/or a variable-length array. The operation type $\tau_i$ further defines a set of input slots ($in_1^i$, $in_2^i$, . . . ) and a set of output slots ($out_1^i$, $out_2^i$, . . . ). That is, each respective node has one or more input slots and/or output slots. The input slots are able to receive an input, e.g., an intermediate image, and the output slots provide one or more output intermediate images that have been transformed by the operation type $\tau_i$ of a respective node.

As noted above, the edges define the information flow in the node graph 302. In this example, the edges are unidirectional such that an edge $e_i=(out_i^j, in_i^k)$ connects an output slot of a first node to one or more input slots of a second node, third node, etc. An output slot, for instance, is able to pass data (e.g., one or more intermediate images) to multiple nodes. In an example, a particular edge $e_i$ connects an output slot $e_i^{out}$ of a first node to an input slot $e_i^{in}$ of a second node.

As further discussed below, the representation module 116 is able to evaluate the node graph 302 by performing operations defined by the various nodes in a topological order. For instance, evaluation of the node graph 302 produces a procedural material 124 with a particular visual appearance. In various examples, the procedural material 124 includes a set of two-dimensional maps that describe various material features, e.g., diffuse color, roughness, normal, height, etc. By way of example, FIG. 3b depicts an example procedural material 308 such as an ash brick wall generated based on the node graph 302. The procedural material 308 is usable in subsequent digital content editing and design operations and retains the advantageous properties of procedurally generated materials, e.g., tileability, resolution independence, responsiveness to simulated lighting conditions, and ease of editability. Manual authoring of the node graphs is challenged by the inherent complexity of the node graphs and typically relies on professional expertise, which is often time-consuming and limits creative applications.

Accordingly, the techniques described herein enable generation of a procedural model 118 based on an input digital image 122. To do so, the representation module 116 includes a training module 202 that is operable to receive a training dataset 204 that includes a plurality of training pairs (block 902). Each respective training pair includes a training procedural model and a corresponding training target image. An example training procedural model, for instance, includes a node graph and the corresponding training target image is generated by the training module 202 by evaluating the node graph. In other words, the training target image represents an image of a procedural material generated by the corresponding training procedural model.

In various examples, the training module 202 is configured to generate the training dataset 204. By way of example, the training module 202 receives a corpus of sample procedural models, e.g., from a Substance Source Adobe® dataset that includes a variety of node graphs. The training module 202 is operable to generate the training procedural models by configuring the corpus of sample procedural models such that each sample procedural model is in a compatible format (e.g., a uniform node graph format) by removing and/or editing one or more of the sample procedural models.

Further, the training module 202 is operable to edit the training procedural models, such as to ensure a consistent bit depth, correct missing dependencies within the training procedural models, and/or enable alpha channels within the training procedural models. In some examples, the training module 202 is operable to "prune" nodes from the training procedural models. In this way, the training module 202 is able to remove unnecessary material representations and reduce computational redundancies, which reduces the size of the training procedural models and thus conserves computational resources in subsequent training operations.

In various examples, one or more of the training procedural models include at least one "switch node." A switch node is a node of a node graph that is operable to select between two or more "branches" of the node graph. For instance, switch nodes support generation of multiple material representations within a single node graph. However, switch nodes are prohibitive for the machine learning model training described herein. Accordingly, when generating the training dataset 204 the training module 202 is operable to remove switch nodes from one or more training procedural models. For instance, the training module 202 is operable to generate a training procedural model for each branch created by the switch node. In this way, the training module 202 augments the training dataset 204 to include additional training pairs.

In some examples, the training module 202 further refines the training dataset 204 by removing training pairs that are within a threshold level of similarity to another training pair. For instance, the training module 202 computes an average mean square difference between training target images of training pairs. If two training pairs have a similarity within a threshold, e.g., a mean square difference less than 0.01, the training module 202 removes one or both of the training pairs from the training dataset 204. In this way, the techniques described herein support enhanced diversity within the training dataset 204 which reduces bias in the machine learning model.

In various examples, the training module 202 is further operable to remove training pairs from the training dataset 204 based on complexity of training procedural models. For instance, the training module 202 filters training pairs that include a training procedural model that have a number of nodes, edges, and/or slots over a threshold value. In some implementations, the threshold value is based on a length distribution of the training dataset 204 as a whole. For example, the training module 202 calculates a distribution of a number of nodes, edges, and/or slots for the training pairs. The training module 202 then determines a threshold value based on the distribution and filters out training pairs that are above the threshold value, e.g., with a number of nodes, edges, and/or slots above the threshold value. In this way, the techniques described herein conserve computational resources by removing computationally expensive training pairs from the training dataset 204.

Further, the training module 202 is operable to select a plurality of parameter sets for each training procedural model. For example, the training module 202 determines multiple, e.g., one hundred, different parameter sets for each training procedural model in the training dataset 204. In this way, the parameter sampling techniques described herein efficiently augment the number of training pairs included in the training dataset 204.

However, in some examples random sampling of the parameter sets results in training pairs with low fidelity, e.g., a target training image that is blank or is monochromatic which is not practical for training. Accordingly, in various implementations the training module 202 generates the parameter sets based on a statistical distribution of parameters extracted from the corpus of sample procedural models, e.g., the Substance Source Adobe® dataset. For example, the training module 202 is operable to sample a parameter p for a particular training procedural model g based on a Gaussian distribution $G(\mu_p{}^g, \beta\sigma_p)$. In this example, a mean of the Gaussian distribution is a value $\mu_p{}^g$ and a standard deviation is scaled by a factor $\beta$ from p's standard deviation among a dataset $\sigma_p$.

In one example, the training module 202 leverages a uniform distribution based on a scaled range, e.g., $U((1-\alpha) \mu_p{}^g, (1+\alpha)\mu_p{}^g)$ where $\alpha$ is a scaling factor. In this example, $\alpha$ and $\beta$ are selected by the training module 202 to achieve a balance between fidelity and diversity. For instance, $\alpha$ is set to 0.06 and $\beta$ is to 0.2 for sampling float types, and when sampling integer types $\alpha$ is set to 0.06 and $\beta$ is to 0.2. In this way, the training module 202 is operable to generate the training dataset 204 with increased diversity of training pairs in a manner that reduces computational resource consumption during training.

Using the training dataset 204, the training module 202 is operable to train a machine learning model 206 to generate procedural models 118 based on input digital images 122 (block 904). The machine learning model 206, for instance, includes one or more conditional generators that are trained to generate procedural models 118 "conditionally" e.g., based on visual features of input images. In an example, the procedural models 118 are node graphs that are generated as "tokenized" sequences of nodes, edges, and parameters. Generally, the tokens are constituent elements of the respective sequences, e.g., a basic unit of representation for the respective node, edge, and parameter sequences. Accordingly, the machine learning model 206 includes three transformers such as a node transformer 208, an edge transformer 210, and a parameter transformer 212. Each of the three transformers are trained to be conditional, e.g., the transformers are able to receive conditional inputs such as features obtained from an input image.

As further described below, the node transformer 208 is trained to generate a node sequence based on features of the input digital image 122. The edge transformer 210 is trained to generate an edge sequence based on the node sequence as well as on features of the input digital image 122. The parameter transformer 212 is conditioned on the features of the input digital image 122 as well as on the node sequence and the edge sequence to generate a parameter sequence, e.g., parameters for each node of the node graph. By providing the parameter transformer 212 with the edge sequence, the parameter transformer 212 is able to adapt parameters for a given node based on a local context in the node graph as further described below.

Accordingly, training the machine learning model 206 includes training the node transformer 208, the edge transformer 210, and the parameter transformer 212. For each transformer, the training procedural models of the training pairs are used as ground truths for inputs of the corresponding training target images. Further, in some examples the training includes calculating a binary cross-entropy loss over probabilities generated by the respective transformers, e.g., the conditional node transformer 208, the conditional edge transformer 210, and the conditional parameter transformer 212. The training module 202 is configured to train the three transformers using a teacher forcing technique. For instance, during generation of a next token in a respective sequence, the ground-truth sequence is used as a previously generated token. In this way, the training module 202 is further operable to prevent overfitting by maintaining a checkpoint with a minimum validation loss.

Once trained, the representation module 116 is operable to receive an input including an input digital image 122 having a particular visual appearance (block 906). Generally, the particular visual appearance includes one or more properties of a material depicted by the input digital image such as a color, texture, gloss, transparency, reflectivity, opacity, luster, sheen, surface roughness, opalescence, iridescence, matte, porosity, randomness, presence of glyphs/icons/picture, and/or one or more patterns of the material. This is by way of example and not limitation, and a variety of material properties are considered as part of the particular visual appearance.

The input digital image 122 is configurable in a variety of ways and/or file formats, such as a JPEG, PNG, GIF, raster image, vector image, etc. The input digital image 122 is able to include a variety of digital content, such as one or more photographs, drawings, paintings, graphics, illustrations, cartoons, etc. In one example, the input digital image 122 is captured by a user of a computing device 102, e.g., using one or more image capture devices. The representation module 116 is then operable to generate a procedural model 118 based on the captured input digital image 122 using the techniques described herein. In an additional or alternative example, the input digital image 122 is obtained by the representation module 116 via the internet, such as obtained automatically and without user intervention and/or uploaded by a user. This is by way of example and not limitation, and a variety of input digital images 122 are considered.

The representation module 116 is operable to generate a procedural model 118 usable to recreate the particular visual appearance of the input digital image 122 using the trained machine learning model 206 (block 908). As mentioned above, the machine learning model 206 includes one or more transformers, such as a node transformer 208, an edge transformer 210, and a parameter transformer 212. To generate the procedural model 118 based on the input digital image 122, the machine learning model conditions each of the transformers on the input digital image 122. For instance, the transformers are configured to accept conditional inputs, e.g., features of the input digital image 122, which are fused with hidden states of each respective transformer.

In an example to do so, the machine learning model 206 encodes the input digital image 122 into a feature vector that includes one or more feature representations that capture various properties of the input digital image 122. In this example, the input digital image 122 is encoded into a feature vector using three different feature representations. A first feature representation captures high-level semantic information about the input digital image 122. For instance, the first feature representation is a CLIP (contrastive language image pre-training model) embedding such as described by Radford, et al. *Learning transferable visual models from natural language supervision.* In International Conference on Machine Learning. PMLR, 8748-8763. (2021). The machine learning model 206 is operable to extract CLIP features using a vision transformer such as in a ViT-B/32 model.

The second feature representation captures fine-scale texture details of the input digital image 122. The second feature representation, for instance, includes VGG feature statistics. To obtain the second feature representation, the machine learning model 206 is configured to compute statistics such as a mean and a standard deviation of layers (e.g., ReLu2_1, ReLu3_1, ReLu4_1 layers) of a pre-trained VGG model. The machine learning model 206 then combines the respective means and standard deviations of the layers as part of generating the second feature representation.

The third feature representation captures color information about the input digital image 122, such as large-scale color statistics of the input digital image 122. To generate the third feature representation, the machine learning model 206 downsamples the input digital image 122, such as by reducing the size and/or resolution of the input digital image 122. In an example, the machine learning model 206 downsamples the input digital image 122 to a resolution of 16×16 to generate a 768D vector representation.

The machine learning model 206 is then operable to combine the three feature representations and encode the feature representations into a feature vector. The feature vector, for instance, has a same dimensionality as hidden states of the transformers, e.g., the node transformer 208, the edge transformer 210, and the parameter transformer 212. In an example, the machine learning model 206 encodes the feature vector using a trainable multilayer perceptron (MLP) to one or more attention blocks of the transformers, such as by integrating the feature vector into the hidden states, as well as to connected layers of the transformers. In this way, the machine learning model 206 is configurable to generate the nodes, edges, and parameters of a procedural model 118 based on a variety of features of the input digital image 122.

FIG. 4 depicts an example 400 of an architecture of the machine learning model 206 to perform conditional procedural model generation. As illustrated, the machine learning model 206 includes a node transformer 208, an edge transformer 210, and a parameter transformer 212. Each transformer includes a respective encoder to provide conditioning for a particular input digital image 122. For instance, a first encoder 402 is operable to condition the node transformer 208 on the input digital image 122, a second encoder 404 is operable to condition the edge transformer 210 on the input digital image 122, and a third encoder 406 is employed to condition the parameter transformer 212 on the input digital image 122. Conventional techniques do not support conditioning on an input image, and thus are unable to generate nodes, edges, and/or parameters of a procedural model 118 based on visual features of an input digital image 122.

In the illustrated example, the machine learning model 206 generates a procedural model 118 as a tokenized sequence using the three transformers 208, 210 and 212. The transformers are configured to model a probability distribution over node, edge, and parameter sequences, respectively, and are conditioned on a feature vector y. In this example, the feature vector is based on the input digital image 122 generated in accordance with the techniques described above. The probability distributions are depicted in the illustrated example as output probabilities 408, 410, 412. In various examples, a next token in a respective sequence is determined based on the output probabilities 408, 410, and 412 predicted by the transformers 208, 210, and 212.

In this example, the machine learning model 206 has parameters $\xi$ and models a conditional probability distribution of a sequence S conditioned on y as a product of conditional probabilities for each token $s_i$:

$$p_\xi(S \mid x) := \prod_i p_\xi(s_i \mid s_{<i}, y),$$

where $s_{<i} := s_1, \ldots, s_{i-1}$ denotes a partial token sequence generated up to a token $s_i$. The machine learning model 206 outputs a probability distribution $p_\xi(s_i \mid s_{<i}, y)$ for each iteration, which is then sampled to obtain a next token $s_i$ in the sequence. A dependence between respective sequences, e.g., a node sequence, an edge sequence, and a parameter sequence, is modeled using conditional probabilities as:

$p(g \mid y) := p_\theta(S_n \mid y) p_\phi(S_e \mid S_n, y) \ p_\psi(S_p \mid S_e, S_n, y)$, where $\theta$, $\phi$, and $\psi$ are parameters of the transformer models for node sequences $S_n$, edge sequences $S_e$, and parameter sequences $S_p$, respectively. As described below, the parameters for the procedural model 118 are generated in a single sequence, (e.g., rather than one sequence per node). Further, the parameter probabilities $p_\psi(S_p^i \mid S_e, S_n, y)$ are conditioned on the edge sequence $S_e$ in addition to the node sequence $S_n$.

In this example, the machine learning model 206 leverages the conditional node transformer 208 to generate a node sequence $S_n = (\tau_0, \tau_1, \ldots)$ by iteratively sampling a node model $p_\theta(s_i^n \mid s_{<i}^n, y)$, where $s_i^n$ denotes an element i of the node sequence. Each iteration generates an integer ID $\tau_i$ of a respective node. Further, the node transformer 208 is configured to output a node type and/or a node depth for each respective node. The node depth is a distance of a particular node from an adjacent node, e.g., a distance from a "nearest" output node to the particular node within the node graph. In this way, the machine learning model 206 is able to determine position data for the nodes of the node graph.

To generate an edge sequence $S_e = (e_1^{out}, e_1^{in}, e_2^{out}, e_2^{in}, \ldots)$, the machine learning model 206 leverages the edge transformer 210 to iteratively sample an edge model $p_\theta(s_i^e \mid s_{<i}^e, S_n)$. Each iteration generates a "pointer" to a list of output and input slots in the node graph. In this example, pointers are generated using a transformer with a head based on pointer networks, e.g., as described by Vinyals, et. al. *Pointer Networks*. Advances in Neural Information Processing Systems 28 (2015). The machine learning model 206 determines a list of output and input slots from the node sequence $S_n$ that includes information about an operation type, e.g., a type of image transformation, of a node associated with each respective slot. In some examples, the edge transformer 210 determines a probability that an edge starts or ends at a particular slot.

As noted above, the parameter transformer 212 generates a parameter sequence based on features of the input digital image 122 as well as on the node sequence and the edge sequence. For instance, a parameter sequence $S_n$ is based on the node sequence $S_n$ and the edge sequence $S_e$, which enables the machine learning model 206 to capture a relationship between parameters and edges in the node graph, which is not possible using conventional techniques. In some examples, the parameter transformer 212 generates the parameter sequence based on one or more node types and/or the node depths. Further, in some examples the parameter sequence is generated for the nodes of the node graphs in a single sequence.

For instance, to generate a parameter sequence $S_p = (p_1^1, p_2^1, \ldots p_1^2, p_2^2, \ldots)$, the machine learning model 206 iteratively samples a model $p_\psi(s_j^p \mid s_{<j}^p, S_n, S_e)$. For each iteration, the parameter transformer 212 outputs a parameter. In some instances with vector and/or array-value parameters, the parameter transformer 212 outputs one or more scalar elements of a parameter for each iteration. The parameter transformer 212 further implements a context-aware embedding $\tau_i$ for each node $n_i$ to condition on the node and edge sequences $S_n$ and $S_e$.

In this example, node embeddings are provided as an auxiliary input sequence to the parameter transformer 212 on a "per-node basis", such that each parameter token receives an embedding for the node that is being generated. This is depicted as a per-node attention 414 in FIG. 4. The embedding $\bar{\tau}_i$ includes information about both an operation type $\tau_i$ of the node and the full node sequence $S_n$. The parameter transformer 212 leverages a transformer encoder $\bar{\tau}_i = g^p(S_n, i)$ to compute the embedding.

The parameter transformer 212 is further operable to include edge connectivity information from the edge sequence $S_e$ in the node embedding. By providing the parameter transformer 212 with the edge sequence, the parameter transformer 212 is able to adapt parameters for a given node based on a local context in the node graph. For instance, the parameter transformer 212 implements a graph convolutional network (GCN) 416 to incorporate localized information about each node in the node graph. For instance, the graph convolutional network 416 is operable to capture a behavior of edge connectivity in a neighborhood of a particular node, e.g., based on properties of neighboring nodes.

In an example, given a node embedding t' the graph convolutional network 416, denoted as "h" in this example, captures local edge connectivity information: $\bar{\tau}_i = \bar{\tau}_i + h (S_n, S_e, i)$. The graph convolutional network 416 is configurable in a variety of ways to capture edge structure from a predetermined number of edges away from a node $n_i$. In one example, the graph convolutional network 416 includes six layers, and is configured to capture edge structure information that is up to six edges "away" from a particular node. In some examples, the parameter sequence includes one or more auxiliary start and end tokens as well as marker tokens that indicate a start of parameter subsequences for each node. In this way, the techniques described herein overcome limitations of conventional techniques that fail to consider neighborhood information about nodes when generating procedural model 118.

Further, in some examples the representation module 116 is further operable to impose one or more semantic validity constraints during generation of the procedural model 118, such as to reduce an incidence of error propagation. For example, because the machine learning model 206 includes multiple (e.g., three) transformers operating in succession, errors that are generated early in the process can propagate and cause unintended downstream consequences. To prevent this from occurring, the representation module 116 is operable to decode the sequences during sampling using one or more semantic validity checks to ensure error-free generation.

In various embodiments, the validity checks include one or more of a monotonic node depth validity check, an edge connectivity validity check, and a parameter value validity check. The monotonic node depth validity check, for instance, is implemented by the representation module 116 to ensure that a node depth of the procedural model 118 is monotonically increasing or decreasing over a node sequence such as for back-to-front/front-to-back ordering. The representation module 116 performs the edge connectivity validity check to ensure that each edge of the procedural model 118 connects a single output slot of a first node with an input slot of a second node. Further, the edge connectivity validity check ensures that edges are prohibited from forming cycles.

The parameter value validity check ensures that parameter values are sampled within a valid range for each parameter. For instance, the representation module 116 implements a maximum and a minimum for each parameter. The representation module 116 is further configured to verify complete generation of parameters, e.g., that a first vector-valued parameter has a complete set of elements generated before initiating generation of a second parameter. Accordingly, these validity checks ensure semantic consistency throughout generation of the procedural model 118, which is not possible using conventional techniques.

Accordingly, using the above-described techniques the representation module 116 is operable to generate one or more procedural models 118 based on the input digital image 122. Due to the inherent complexity of node graphs, in various examples there are more than one suitable node graph that are able to accurately represent the input digital image 122. Thus, in some examples the representation module 116 leverages the machine learning model 206 to generate a plurality of node graphs, e.g., two or more candidate procedural models such as candidate models 214.

For instance, FIG. 5 depicts an example 500 of generating several procedural models 118 based on an input image in accordance with the techniques described herein in a first example 502 and a second example 504. For instance, as shown in the first example 502, the representation module 116 is operable to receive an input digital image 122 such as the first image 506. In this example, the first image 506 is a digital image with a particular visual appearance, e.g., the first image 506 depicts a grey-white tile material with a distinctive surface pattern.

The representation module 116 generates a plurality of procedural models 118, e.g., three candidate models 214, to recreate the visual appearance of the first image 506, such as a first node graph 508, a second node graph 510, and a third node graph 512. Further depicted are a first procedural material 514 generated based on the first node graph 508, a second procedural material 516 generated based on the second node graph 510, and a third procedural material 518 generated based on the third node graph 512. As illustrated, the first, second and third node graphs 508, 510, and 512 have variable properties, e.g., differing numbers and configuration of nodes and edges, however each is usable to recreate a visual appearance of the first image 506 with minor variations in appearance.

The second example 504 depicts a similar example. As shown in the second example 504, a second image 520 is a digital image that depicts a dark, reflective material with a distinctive dimpled surface. As above, the representation module 116 generates three node graphs based on the second image, such as a first, second, and third node graph 522, 524, and 526. Procedural materials generated based on the first, second, and third node graphs 522, 524, and 526 are further depicted, such as a first procedural material 528, a second procedural material 530, and a third procedural material 532.

Similar to the above example, the first, second, and third node graphs 522, 524, and 526 have variable properties such as a differing number and configuration of nodes and edges. However, while the first, second, and third procedural materials 528, 530 and 532 have a visual appearance that is relatively similar to the second image 520, the visual differences in the corresponding procedural materials are readily apparent in this example. For instance, the second procedural material 516 based on the second node graph 522 more closely resembles the second image 520 than either the first procedural material 528 or third procedural material 532.

Accordingly, in some examples the representation module 116 includes a refinement module 216 that is employed to select one or more of the candidate models 214 and/or adjust various properties of one or more of the candidate models 214 to improve the correlation between a procedural material 124 generated based on the procedural model 118 and the input digital image 122. For instance, the refinement module 216 is operable to select a candidate model 214 and/or a subset of candidate models that have corresponding procedural materials 124 "most similar" to the input digital image 122. Further, the refinement module 216 is configurable to optimize parameter values of the procedural model 118, e.g., parameters of various nodes of the node graph.

For example, the refinement module 216 includes a ranking module 218 that is employed to generate a ranking for each of the candidate models 214. The ranking is based on a visual similarity of candidate digital images that are generated based on the candidate models 214, e.g., by evaluating the candidate models 214 as further described below, to the input digital image 122. In various examples, the procedural model 118 is generated based on the ranking, such as selecting a candidate model 214 with a corresponding candidate digital image that is most similar to the input digital image 122.

By way of example, the representation module 116 generates several candidate models 214 based on the input digital image 122, such as by using a variety of sampling schemes. The representation module 116 generates several candidate digital images by evaluating the candidate models 214. The ranking module 218 ranks the candidate models 214 based on a visual similarity of the candidate digital images to the input digital image 122 by calculating one or more visual similarity metrics. In one example, the visual similarity metric is a CLIP cosine distance metric. Additionally or alternatively, the visual similarity metric is based on a Wasserstein distance, such as a sliced Wasserstein L1 distance. This is by way of example and not limitation, and a variety of visual similarity metrics are considered. Based on the ranking, the refinement module 216 is operable to select one or more of the candidate models 214 to be the procedural model 118 and/or for further optimization.

For instance, the refinement module 216 includes an optimization module 220 that is employed to adjust one or more parameters of the candidate models 214 and/or the procedural model 118. Consider an example candidate model 214 that includes a node graph. The optimization module 220 implements a differentiable optimization that is able to adjust parameters of one or more nodes of the node graph such that a procedural material 124 rendered based on the example candidate model 214 has an increased visual similarity to the input digital image 122. In an example, the optimization module 220 calculates and/or leverages a gradient descent to adjust one or more parameters of the node graph.

In an additional or alternative example, the optimization module 220 generates a differentiable proxy for one or more nodes in the node graph and approximates a contribution of each respective node to the node graph based on the differentiable proxies. For instance, the optimization module 220 generates differentiable proxies as described in Hu, et al. 2022a. *Node Graph Optimization Using Differentiable Proxies*. ACM SIGGRAPH 2022 Conference Proceedings. Article 5, p. 9. (2022). Based on the respective contributions, the optimization module 220 adjusts the one or more parameters. In this way, the optimization module 220 is able to adjust parameters of node graphs such that the procedural model 118 has an increased visual similarity to the input digital image 122.

FIG. 6 depicts an example 600 of parameter optimization in conditional procedural model generation in a first example 602, a second example 604, and a third example 606. In this example, example input images 608, 610, and 612 are illustrated on the left. In accordance with the technique described herein, the representation module 116 generates several procedural models based on the respective input images 608, 610, and 612. The procedural models are evaluated to generate corresponding procedural materials, such as the images depicted on the right.

As shown in the first example 602, the top row depicts unoptimized procedural materials 614, while the bottom row depicts optimized procedural materials 616. For instance, the optimized procedural materials 616 correspond to procedural models that have had one or more parameters adjusted by the representation module 116 such as the differentiable optimization as described above while the unoptimized procedural materials 614 correspond to procedural models that have not undergone the differentiable optimization. As illustrated, the optimized procedural materials 616 have an increased visual similarity to the input image 608 as compared to the unoptimized procedural materials 614.

The second example 604 depicts a similar example, for instance the top row depicts unoptimized procedural materials 618, while the bottom row depicts optimized procedural materials 620. As in the example above, the optimized procedural materials 620 have an enhanced visual similarity to the input image 610. For instance, a color of the optimized procedural materials 620 is the same as the input images 610 while the unoptimized procedural materials 618 have a variable color. Similarly, in the third example 606 the optimized procedural materials 624 have an increased visual similarity to the input image 612 as compared to the unoptimized procedural materials 622. Accordingly, the parameter optimization techniques support an enhanced ability to generate a procedural model 118 that recreates a particular visual appearance of an input digital image 122.

The representation module 116 further includes an evaluation module 222 that is operable to evaluate the procedural model 118 to generate a procedural material 124 for display in a user interface 110 (block 910). For instance, the evaluation module 222 is operable to evaluate a procedural model 118 that includes a node graph by performing operations defined by nodes of the node graph to render the procedural material 124. The operations are performed in a topological order, such as defined by edges of the node graph. Further, the operations are performed based on the parameters generated as described above. Once rendered, the procedural material 124 is usable to perform a variety of functionalities and used in a variety of applications such as a variety of editing and/or design operations.

FIG. 7 depicts an example 700 of conditional procedural model generation to generate a procedural material in a first stage 702, a second stage 704, and a third stage 706. In this example, a user is designing a digital object in a three-dimensional modeling application. The user desires to apply a digital texture to the digital object to "look like" an image of a chess board that the user obtained on the internet.

At first stage 702, the representation module 116 receives a digital image 708. In this example, the digital image 708 is the image of the chess board and has a particular visual appearance that includes a faded black-and-white checkered design. At second stage 704, the representation module 116 leverages a trained machine learning model 206 to generate a procedural model 710 that is based on the digital image 708.

The procedural model 710 in this example is a node graph that includes a node sequence, an edge sequence, and a parameter sequence. As described above, each of the node sequence, edge sequence, and parameter sequence are conditional on the digital image 708. The procedural model 710 is usable to recreate the particular visual appearance of the digital image 708. For instance, as further depicted in second stage 704 the representation module 116 evaluates the procedural model 710 to render a procedural material 712. As illustrated, the procedural material 712 includes the faded black-and-white checkered design of the digital image 708. Although not depicted, in some implementations the procedural material 712 is output for display and/or interaction as in a user interface 110.

At third stage 706, the procedural material 712 is applied to a digital object 714 based on the procedural model 710 in a user interface 110 of a display device 112. The user is able to perform a variety of editing and/or design operations using the procedural model 710, such as to apply the particular visual appearance of the chess board to the digital object 714. In this way, the techniques described herein support generation of a procedural model 710 that is usable to render a procedural material 712 with the particular visual appearance of the digital image 708, while retaining the advantageous properties of procedurally generated materials (e.g., tileability, resolution independence, responsiveness to simulated lighting conditions, ease of editability, etc.) which is not possible using conventional techniques.

Inspiration Procedural Model Generation

In various examples, the techniques described herein are further usable to generate "inspiration" procedural models that are not based on an input image, with an increased performance relative to conventional techniques. For instance, conventional techniques to generate "random" procedural models are prone to bias and thus generate procedural models with limited diversity. Accordingly, in various embodiments the representation module 116 includes an inspiration module 224 that is operable to leverage the techniques and functionality described above to perform unconditional procedural model generation, e.g., to generate one or more procedural models 118 that are not based on an input image. In this way, the inspiration module 224 is able to generate one or more procedural models 118 that are not based on an input image with reduced bias and increased diversity relative to conventional techniques.

In an example, the inspiration module 224 trains a node transformer 208, an edge transformer 210, and a parameter transformer 212 of a machine learning model 206 to generate one or more procedural models 118 (block 1002). For instance, the inspiration module 224 trains an unconditional generator of the machine learning model 206 to generate procedural models 118 unconditionally, e.g., not based on an input image. In various embodiments, the node transformer 208, edge transformer 210, and parameter transformer 212 are independently trained using teacher forcing. Further, in some implementations the inspiration module 224 utilizes one or more training procedural models from the training dataset 204 generated by the training module 202 in accordance with the techniques described herein to train the machine learning model 206. That is, in various examples training data used to train the machine learning model 206 includes a plurality of training procedural models extracted from the training dataset 204. The training dataset 204 includes complex and diverse training procedural models, and thus the machine learning model 206 is trained to generate procedural models that are not conditional on an input image with increased complexity and diversity relative to conventional approaches.

The inspiration module 224 is further operable to receive an input to initiate generation of a procedural model 118 (block 1004). For example, the input is a user input in a user interface 110 that causes the inspirational module 224 to initiate unconditional procedural model generation. In this example, the input does not include an input image such as an input digital image 122 described above as a part of conditional procedural model generation. In an alternative or additional example, the input to initiate generation of the procedural model 118 is generated automatically and without user intervention. In various examples, the input further specifies a quantity of procedural models 118 for the inspiration module 224 to generate. In this way, the techniques described herein support generation of a set of procedural models 118 that represent various digital textures, digital materials, and/or digital patterns without receipt of an input image.

The inspiration module 224 is configured to generate a node sequence using the node transformer 208 (block 1006). In various examples, generation of the node sequence is responsive to receipt of the input. The node sequence, for instance, is generated in accordance with the techniques described above, however is not based on an input image. The inspiration module 224 further generates an edge sequence using the edge transformer 210 of the machine learning model (block 1008). In various examples, the edge sequence is based in part or in whole on the node sequence. Similar to the node sequence, the edge sequence is generated in accordance with the techniques described above, however is also not based on an input image.

The inspiration module 224 is further configured to generate a parameter sequence using the parameter transformer 212 (block 1010). The parameter sequence, for instance, is based on either or both the node sequence and the edge sequence. By providing the parameter transformer 212 with the node sequence and the edge sequence, the parameter transformer 212 is able to consider a local context of a node within a procedural model 118 when generating the parameter sequence. The inspiration module 224 is operable to leverage the techniques described above to generate the parameter sequence.

The inspiration module 224 is then able to generate the procedural model 118 based on the node sequence, the edge sequence, and the parameter sequence (block 1012). In various implementations, the inspiration module 224 leverages one or more of the above techniques to generate the procedural model 118. For instance, the inspiration module 224 is operable to perform one or more semantic validity checks during generation of the procedural model 118 to reduce an incidence of error. In an example, the inspiration module 224 generates a set of procedural models that include multiple procedural models 118. The multiple procedural models 118 are usable to create a variety of digital textures, digital materials, and digital patterns. In this way, the techniques described herein support generation of "inspiration" procedural materials that represent a variety of appearances.

A representation 800 of enhanced unconditional procedural material generation is shown in FIG. 8 in a first example 802 and a second example 804. For instance, the first example 802 depicts random procedural model generation using conventional techniques. As illustrated, the conventional approach randomly generates sixty-four procedural materials. However, the materials generated using conventional techniques have a notable bias and lack of diversity. For instance, the materials depicted in the first example 802 have a bias for "wood" materials as well as a preference for particular patterns. By way of example, the materials shown at 806, 808, 810, and 812 have the same patterns. Accordingly, procedural materials generated using conventional techniques have limited applicability.

The second example 804, however, depicts generation of a variety inspiration procedural materials using the techniques described herein. Because the inspiration module 224 leverages the training dataset 204, the machine learning model 206 is trained to generate procedural models 118 with increased diversity. Further, the techniques used to generate the procedural models 118, such as generating a parameter sequence based on an edge sequence and a node sequence, as well as sampling techniques and performance of semantic validity checks, encourages the machine learning model 206 to generate procedural models 118 with reduced bias and greater complexity of appearances relative to conventional approaches.

Example System and Device

FIG. 11 illustrates an example system generally at 1100 that includes an example computing device 1102 that is representative of one or more computing systems and/or devices that implement the various techniques described herein. This is illustrated through inclusion of the representation module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving, by a processing device, a training dataset including a plurality of training pairs, each said training pair including a training procedural model and a corresponding training target image;
    configuring, by the processing device, a machine learning model to generate procedural models based on input digital images by training a conditional node transformer, a conditional edge transformer, and a conditional parameter transformer of the machine learning model using the training dataset;
    receiving, by the processing device, an input including an input digital image having a particular visual appearance; and
    generating, by the processing device, a procedural model usable to recreate the particular visual appearance of the input digital image using the trained machine learning model.

2. The method as described in claim 1, wherein the procedural model is a node graph that includes a sequence of parametrized nodes connected by one or more edges to represent one or more of a digital texture or a digital pattern of the input digital image.

3. The method as described in claim 1, further comprising generating the training dataset, wherein the generating the training dataset includes removing at least one switch node from one or more training procedural models, and sampling a plurality of parameter sets for each said training pair.

4. The method as described in claim 1, wherein the configuring the machine learning model includes calculating a binary cross-entropy loss over probabilities generated by the conditional node transformer, the conditional edge transformer, and the conditional parameter transformer.

5. The method as described in claim 1, wherein the generating the procedural model includes encoding the input digital image into a feature vector and conditioning the conditional node transformer, the conditional edge transformer, and the conditional parameter transformer on the feature vector.

6. The method as described in claim 5, wherein the conditional parameter transformer is conditioned on the feature vector, node sequences generated by the conditional node transformer, and edge sequences generated by the conditional node transformer.

7. The method as described in claim 1, wherein the generating the procedural model includes generating candidate procedural models, generating a ranking for each of the candidate procedural models based on a visual similarity of candidate digital images based on the candidate procedural models to the input digital image, and generating the procedural model based on the ranking.

8. The method as described in claim 7, wherein the ranking is based on one or more of a sliced Wasserstein distance or a CLIP cosine distance between the candidate digital images and the input digital image.

9. The method as described in claim 1, wherein the generating the procedural model includes generating a node sequence based on the input digital image by the conditional node transformer, generating an edge sequence based on the input digital image and the node sequence using the conditional edge transformer, and generating a parameter sequence based on the input digital image, the node sequence, and the edge sequence using the conditional parameter transformer.

10. A system comprising:
    a memory component; and
    a processing device coupled to the memory component, the processing device to perform operations including:

receiving a trained machine learning model configured to generate procedural models based on input digital images;

receiving an input including an input digital image having a particular visual appearance; and generating a procedural model usable to recreate the particular visual appearance of the input digital image by conditioning a conditional node transformer, a conditional edge transformer, and a conditional parameter transformer of the trained machine learning model on visual features of the input digital image.

11. The system as described in claim 10, wherein the procedural model is a node graph that represents one or more of a digital texture, a digital pattern, or a digital material of the input digital image.

12. The system as described in claim 10, wherein the trained machine learning model is trained by independently training the conditional node transformer, the conditional edge transformer, and the conditional parameter transformer.

13. The system as described in claim 12, wherein the trained machine learning model is trained by calculating a binary cross-entropy loss over probabilities generated by the trained machine learning model during training.

14. The system as described in claim 10, wherein generating the procedural model includes generating a plurality of candidate procedural models, generating a ranking for each of the candidate procedural models based on a visual similarity of candidate digital images based on the candidate procedural models to the input digital image, and generating the procedural model based on the ranking.

15. The system as described in claim 10, wherein generating the procedural model includes performing one or more semantic validity checks.

16. The system as described in claim 10, wherein generating the procedural model includes generating nodes for the procedural model using the conditional node transformer, generating edges between the nodes using the conditional edge transformer, and generating parameters for each of the nodes using the conditional parameter transformer.

17. A non-transitory computer-readable storage medium storing executable instructions, which when executed by a processing device, cause the processing device to perform operations comprising:

training a node transformer, an edge transformer, and a parameter transformer of a machine learning model configured to generate procedural models;

receiving, in a user interface of the processing device, an input to initiate generation of a procedural model;

generating, responsive to the input, a node sequence using the node transformer and an edge sequence using the edge transformer of the machine learning model;

generating a parameter sequence using the parameter transformer based on the node sequence and the edge sequence; and generating the procedural model based on the node sequence, the edge sequence, and the parameter sequence.

18. The non-transitory computer-readable storage medium as described in claim 17, further comprising generating a set of procedural models that includes a plurality of procedural models that represent a plurality of digital textures, digital materials, and digital patterns.

19. The non-transitory computer-readable storage medium as described in claim 17, wherein the edge sequence is based on the node sequence.

20. The non-transitory computer-readable storage medium as described in claim 17, wherein the training includes independently training the node transformer, the edge transformer, and the parameter transformer.

* * * * *